US012241281B2

(12) United States Patent
Stein et al.

(10) Patent No.: US 12,241,281 B2
(45) Date of Patent: Mar. 4, 2025

(54) ELECTRONIC LATCH

(71) Applicant: Southco, Inc., Concordville, PA (US)

(72) Inventors: Ingobert Günter Stein, Worcester (GB); Nicholas Paul Bennett, Worcestershire (GB)

(73) Assignee: Southco, Inc., Concordville, PA (US)

(*) Notice: Subject to any disclaimer, the term of this patent is extended or adjusted under 35 U.S.C. 154(b) by 557 days.

(21) Appl. No.: 17/273,110

(22) PCT Filed: Sep. 16, 2019

(86) PCT No.: PCT/US2019/051244
§ 371 (c)(1),
(2) Date: Mar. 3, 2021

(87) PCT Pub. No.: WO2020/060901
PCT Pub. Date: Mar. 26, 2020

(65) Prior Publication Data

US 2021/0324661 A1 Oct. 21, 2021

Related U.S. Application Data

(60) Provisional application No. 62/732,251, filed on Sep. 17, 2018.

(51) Int. Cl.
*E05B 47/00* (2006.01)
*E05B 47/06* (2006.01)
*E05C 3/24* (2006.01)

(52) U.S. Cl.
CPC ...... *E05B 47/0012* (2013.01); *E05B 47/0607* (2013.01); *E05C 3/24* (2013.01); (Continued)

(58) Field of Classification Search
CPC ......... E05B 2047/0024; E05B 47/0012; E05B 81/14; Y10T 292/1082; Y10S 292/14
See application file for complete search history.

(56) References Cited

U.S. PATENT DOCUMENTS 5,498,040 A 3/1996 Silye
5,738,393 A * 4/1998 Chao ........................ E05B 83/24 292/216

(Continued)

FOREIGN PATENT DOCUMENTS

CN 101086191 A 12/2007
DE 29701390 U1 * 10/1997 ............. E05B 81/14

(Continued)

OTHER PUBLICATIONS

Chinese Office Action with Search Report for Chinese Application No. 201980066011.0, issued Jan. 26, 2022, with translation, 20 pages.

(Continued)

*Primary Examiner* — Carlos Lugo
(74) *Attorney, Agent, or Firm* — Buchanan Ingersoll & Rooney PC

(57) ABSTRACT

A latch for capturing a striker. The latch includes a pawl mounted to rotate between a closed position and an open position, the pawl being biased to rotate toward the open position and configured to capture the striker when in the closed position. A trigger is mounted to rotate about a first axis between a locked position and an unlocked position, the trigger being biased to rotate toward the locked position and selectively positionable to contact the pawl when the pawl is in the closed position, thereby retaining the pawl in the closed position. An input cam is connected to the trigger. An output cam is positioned to contact the input cam, the output cam being mounted to rotate about a second axis and configured to rotate the input cam about the first axis. A motor is coupled for rotating the output cam about the second axis.

13 Claims, 22 Drawing Sheets

(52) U.S. Cl.
CPC ................. *E05B 2047/0024* (2013.01); *E05B 2047/0067* (2013.01)

(56) References Cited

U.S. PATENT DOCUMENTS

| | | | | |
|---|---|---|---|---|
| 5,938,252 | A * | 8/1999 | Uemura | E05B 81/14<br>292/216 |
| 6,437,532 | B2 * | 8/2002 | Koerwer | E05B 81/64<br>292/DIG. 3 |
| 6,471,259 | B1 * | 10/2002 | Weyerstall | E05B 81/14<br>292/216 |
| 6,619,085 | B1 | 9/2003 | Hsieh | |
| 7,000,956 | B2 | 2/2006 | Fisher | |
| 8,328,249 | B2 * | 12/2012 | Corrales | E05B 81/14<br>292/216 |
| 8,333,530 | B2 * | 12/2012 | Omori | B60N 2/01583<br>403/325 |
| 9,255,429 | B2 * | 2/2016 | Kim | E05B 83/24 |
| 9,435,145 | B2 * | 9/2016 | Lujan | E05B 81/14 |
| 9,546,503 | B2 * | 1/2017 | Krueger | E05B 47/06 |
| 9,809,999 | B2 * | 11/2017 | Weinerman | E05B 81/14 |
| 9,915,082 | B2 | 3/2018 | Garneau | |
| 2005/0082842 | A1 * | 4/2005 | Warmke | E05B 81/14<br>292/216 |
| 2007/0158954 | A1 * | 7/2007 | Warmke | E05B 81/16<br>292/201 |
| 2007/0257496 | A1 * | 11/2007 | Spurr | E05B 85/26<br>292/57 |

FOREIGN PATENT DOCUMENTS

| | | | | |
|---|---|---|---|---|
| DE | 102006032033 | A1 * | 3/2007 | E05B 81/14 |
| DE | 102013113384 | A1 * | 6/2015 | E05B 81/14 |
| EP | 1398436 | A1 * | 3/2004 | E05B 47/0012 |
| KR | 100962139 | B1 * | 6/2010 | |
| WO | 2016073865 | A1 | 5/2016 | |
| WO | 2017142908 | A1 | 8/2017 | |
| WO | 2016150432 | A1 | 9/2019 | |

OTHER PUBLICATIONS

Chinese Office Action for Chinese Application No. 201980066011.0, issued Aug. 16, 2022, with translation, 22 pages.

International Preliminary Report on Patentability and Written Opinion for International Application No. PCT/US2019/051244, issued Mar. 9, 2021, 10 pages.

European Communication pursuant to Article 94(3) for European Application No. 19 779 657.6, dated Feb. 18, 2022, 5 pages.

International Search Report and Written Opinion for International Application No. PCT/US2019/051244, dated Jan. 2, 2020, 14 pages.

* cited by examiner

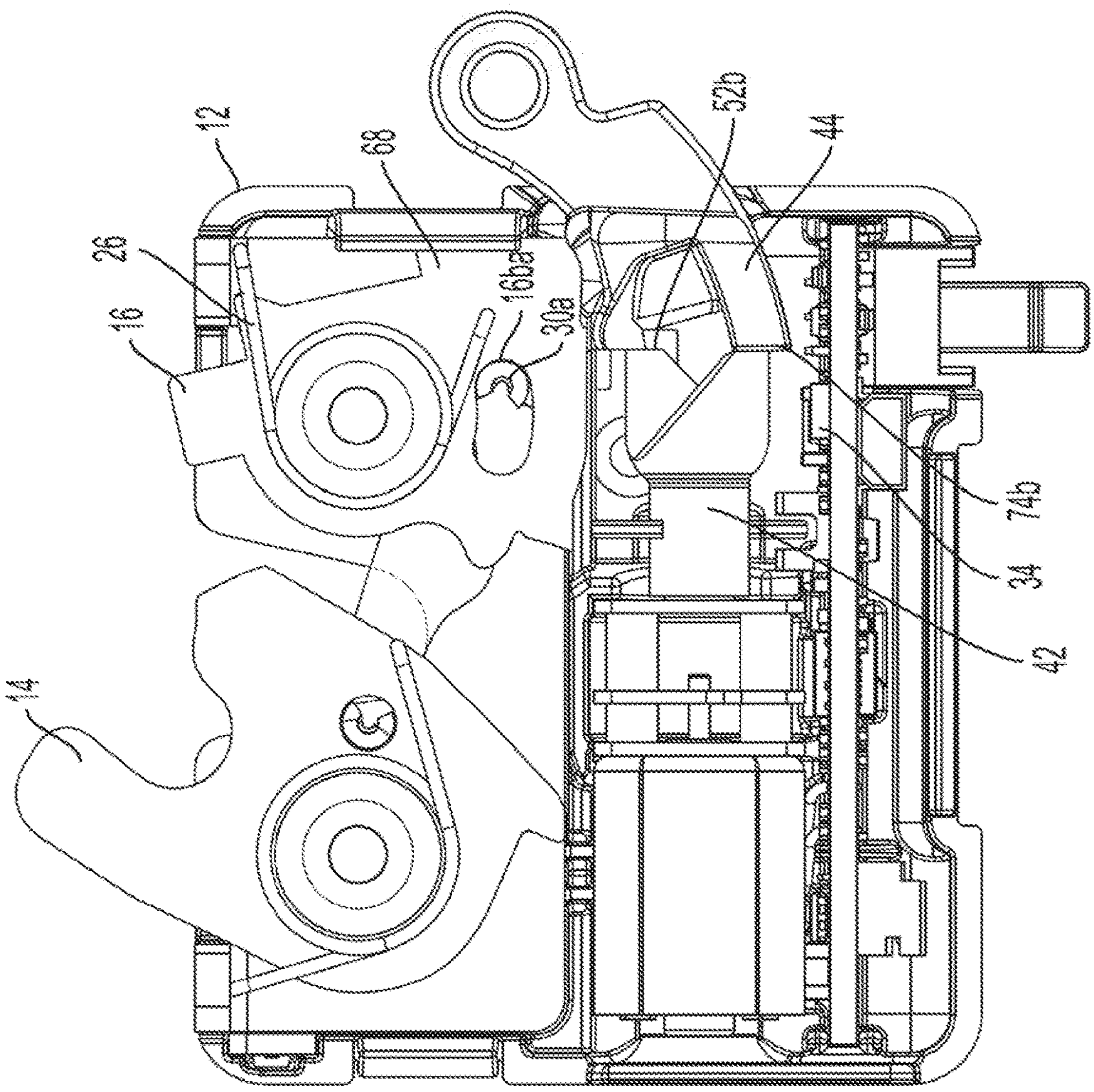
FIG. 8B

ELECTRONIC LATCH

CROSS-REFERENCE TO RELATED APPLICATION

This application is a U.S. national phase application filed under 35 U.S.C. § 371 claiming benefit to International Patent Application No. PCT/US2019/051244, filed Sep. 16, 2019, which is related to, and claims priority to U.S. Provisional Application No. 62/732,251 filed Sep. 17, 2018, the entire disclosures of which is are incorporated herein by reference in their entirety for all purposes.

FIELD OF THE INVENTION

The present invention relates to the field of latches and electronic latch assemblies.

BACKGROUND OF THE INVENTION

Latch assemblies are relied on in many applications for securing items such as panels, doors, and doorframes together. For example, containers, cabinets, closets, drawers, compartments and the like may be secured with a latch. One type of latch assembly includes a rotary pawl or cam, which remains open until the pawl or cam impinges on a striker (or bolt). The relative displacement of the assembly with respect to the striker causes the rotary pawl or cam to rotate and capture the striker.

In many applications, an electrically operated latch is desirable due to the need for remote or push-button entry, coded access, key-less access, or monitoring of access. Various latches for panel closures have been employed where one of the panels, such as a swinging door, drawer or the like, is to be fastened or secured to a stationary panel, doorframe, cabinet, or compartment body. Such a latch is disclosed in U.S. Pat. No. 9,915,082, which is incorporated by reference herein in its entirety and for all purposes.

There exists a need for new rotary pawl or cam latch assemblies that include the option of electrical operation having a design that is at least one of simpler, more compact, and cost-effective.

SUMMARY OF THE INVENTION

According to one aspect, a latch for capturing a striker is provided. The latch includes a pawl mounted to rotate between a closed position and an open position, the pawl being biased to rotate toward the open position and configured to capture the striker when in the closed position. A trigger is mounted to rotate about a first axis between a locked position and an unlocked position, the trigger being biased to rotate toward the locked position and selectively positionable to contact the pawl when the pawl is in the closed position, thereby retaining the pawl in the closed position. An input cam is connected to the trigger. An output cam is positioned to contact the input cam, the output cam being mounted to rotate about a second axis and configured to rotate the input cam about the first axis. A motor is coupled for rotating the output cam about the second axis. Rotation of the motor about the second axis causes rotation of the trigger about the first axis, and wherein the first axis is non-parallel to the second axis.

According to another aspect, a latch for capturing a striker is provided. The latch includes a pawl mounted to rotate between a closed position and an open position, the pawl being biased to rotate toward the open position and configured to capture the striker when in the closed position. A trigger is mounted to rotate between a locked position and an unlocked position, the trigger being biased to rotate toward the locked position and selectively positionable to contact the pawl when the pawl is in the closed position, thereby retaining the pawl in the closed position. A link couples the pawl to the trigger, wherein the link is configured to prevent the trigger from moving to the locked position while the pawl is maintained in the open position.

According to yet another aspect, a door assembly comprises:

- a frame defining an opening;
- a door that is moveable with respect to the frame for concealing the opening in the frame;
- a striker attached to one of the door and the frame;
- a latch attached to the other of the door and the frame for capturing the striker, the latch comprising:
- a pawl mounted to rotate between a closed position and an open position, the pawl being biased to rotate toward the open position and configured to capture the striker when in the closed position;
- a trigger mounted to rotate about a first axis between a locked position and an unlocked position, the trigger being biased to rotate toward the locked position and selectively positionable to contact the pawl when the pawl is in the closed position, thereby retaining the pawl in the closed position;
- an input cam connected to the trigger;
- an output cam positioned to contact the input cam, the output cam being mounted to rotate about a second axis and configured to rotate the input cam about the first axis; and
- a motor coupled for rotating the output cam about the second axis;
- wherein rotation of the motor about the second axis causes rotation of the trigger about the first axis, and wherein the first axis is non-parallel to the second axis.

According to still another aspect, a door assembly comprises:

- a frame defining an opening;
- a door that is moveable with respect to the frame for concealing the opening in the frame;
- a striker attached to one of the door and the frame;
- a latch attached to the other of the door and the frame for capturing the striker, the latch comprising:
- a pawl mounted to rotate between a closed position and an open position, the pawl being biased to rotate toward the open position and configured to capture the striker when in the closed position;
- a trigger mounted to rotate between a locked position and an unlocked position, the trigger being biased to rotate toward the locked position and selectively positionable to contact the pawl when the pawl is in the closed position, thereby retaining the pawl in the closed position; and
- a link coupling the pawl to the trigger, wherein the link is configured to prevent the trigger from moving to the locked position while the pawl is maintained in the open position.

BRIEF DESCRIPTION OF THE DRAWINGS

FIGS. 5A-13B depict a sequence for operating the electronic latch of FIGS. 1A-1E, and various component are removed in those figures to reveal internal components of the latch.

More particularly, FIGS. 5A and 5B depict rear and front elevation views, respectively, of the latch of FIGS. 1A-1E shown in a closed and locked configuration.

FIGS. 8A and 8B depict rear and front elevation views, respectively, of the latch of FIGS. 1A-1E shown in an open and unlocked configuration, wherein the cams are rotationally positioned to prevent rotation of the trigger toward the locked position.

FIGS. 9 and 10 depict a rear side view of the latch of FIG. 8A and illustrate what would occur if a striker were to engage (FIG. 9) and then disengage (FIG. 10) the pawl when the latch is maintained in an open and unlocked configuration, and is being operated in a "delayed re-lock" mode.

FIGS. 13A and 13B depict rear and front elevation views, respectively, of the latch of FIGS. 1A-1E shown in a nearly-closed and pre-locked configuration.

DETAILED DESCRIPTION OF THE INVENTION

The invention will now be described by reference to exemplary embodiments and variations of those embodiments. Although the invention is illustrated and described herein with reference to specific embodiments, the invention is not intended to be limited to the details shown and described. Rather, various modifications may be made in the details within the scope and range of equivalents of the claims and without departing from the invention.

Generally, this invention provides a means for capturing a striker, a bolt, a catch, a keeper, or other similar component or structure capable of being captured or otherwise retained by a latch (generically referred to in this description as a striker or latch striker), and for releasing the striker by either the electrical actuation or manual actuation of a trigger. For example, a latch according to one embodiment of the present invention may be actuated manually by directly pulling on a portion of the trigger or remotely pulling on a flexible cable attached to a portion of the trigger. Alternatively for electromechanical operation, an actuator mechanism may push and rotate the trigger upon energizing the mechanism. To secure an object carrying the latch striker, such as a drawer or door, the latch has push to close functionality. The latch may include a pawl that is spring loaded to the open position and a trigger that is spring loaded to the locked position.

Figures 1A, 1B, 1C, 1D, 1E, 1F:
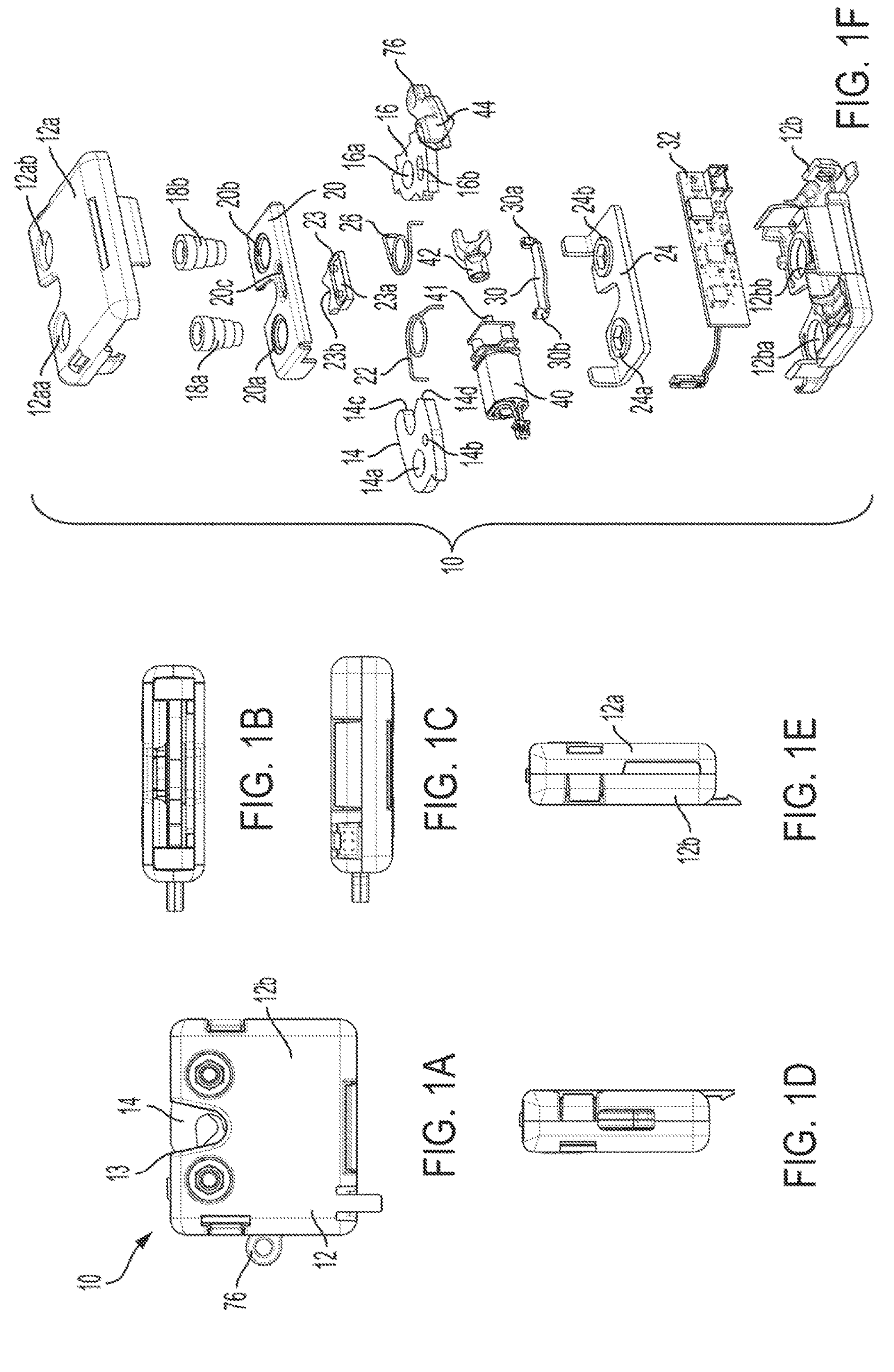
FIG. 1A is a rear isometric view of an electronic latch according to an exemplary embodiment of the invention.
FIGS. 1B-1E are top plan, bottom plan, right side elevation and left side elevation views of the latch of FIG. 1A.
FIG. 1F is an exploded view of the latch of FIG. 1A.
Figure 2:
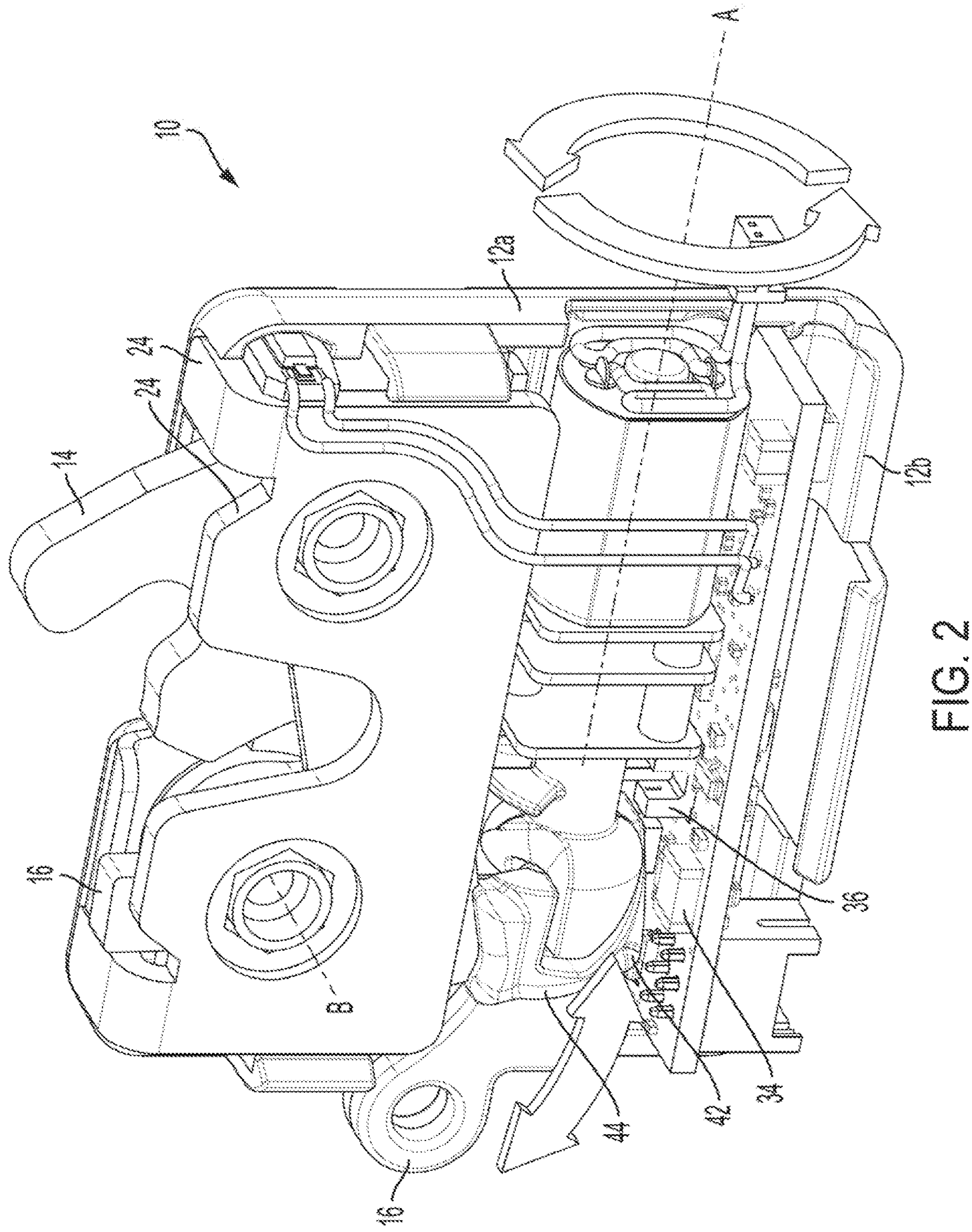
FIG. 2 is a front isometric view of the latch of FIG. 1A, wherein various components are omitted to reveal internal details of the latch.

Referring now to a first embodiment according to the present invention illustrated in FIGS. 1A to 2, a latch 10 according to one embodiment of the invention includes a housing 12. The housing 12 includes a front side housing part 12*a* and a rear side housing part 12*b* that is snap-fit (or otherwise connected) to the part 12*a* and defines a space therein for receiving and accommodating the remaining components of the latch 10. The top end of the housing 12 defines an opening 13 for receiving a striker of a door, panel or drawer (for example) in the unlatched state of the latch 10.

A latch pawl 14 and a trigger 16 are rotatably mounted within the housing 12 by pivot pins 18*a* and 18*b*. The pivot pin 18*a* passes through an opening 12*aa* formed in the housing part 12*a*, an opening 20*a* formed in a front-facing bracket 20, an opening formed in the coil of a tension spring 22, an opening 14*a* formed in the pawl 14, an opening 24*a* formed in the rear-facing bracket 24 and an opening 12*ba* formed in the housing part 12*b*. Similarly, the pivot pin 18*b* passes through an opening 12*ab* formed the housing part 12*a*, an opening 20*b* formed in the front-facing bracket 20, an opening formed in the coil of a tension spring 26, an opening 16*a* formed in the trigger 16, an opening 24*b* formed in the rear-facing bracket 24 and an opening 12*bb* formed in the housing part 12*b*. Fasteners (not shown) may be positioned through the opening of each pivot pin 18 to fasten those components together. Other ways for mounting together the components of the latch 10 are envisioned.

The pawl 14 and the trigger 16 are each held between the brackets 20 and 24 and are capable of rotation about respective axes. In particular, the pawl 14 is configured to rotate about pin 18*a*, and the trigger 16 is configured to rotate about pin 18*b*.

The spring 22 urges the pawl 14 in a counterclockwise direction (as viewed in FIG. 5B) toward the opened position. A small hole is formed in the pawl 14 for receiving one leg of the spring 22. The other leg of the spring 22 is either connected to or rests on an interior surface of the housing 12. The spring 26 urges the trigger 16 in a clockwise direction (as viewed in FIG. 5B) toward the locked position. A small hole is formed in the trigger 16 for receiving one leg of the spring 26. The other leg of the spring 26 is either connected to or rests on an interior surface of the housing 12.

A stop 23 is mounted to the bracket 20 by two pins 23*a* that are press-fit within two holes 20*c* formed in the bracket 20. The stop 23 includes a concave surface 23*b* for engaging with a striker 50 (shown in FIG. 5A) in a locked state of the latch 10 to prevent further downward translation of the striker 50 within the interior 13 of the housing 12.

A link 30 is pivotably connected to the pawl 14 and the trigger 16. A first end 30*a* of the link 30 is connected to a slot 16*b* formed in the trigger 16 such that the link 30 can rotate and translate along the slot 16*b* with respect to the trigger 16. A second, opposite end 30*b* of the link 30 is rotatably connected to a hole 14*b* formed in the pawl 14.

A circuit board 32 is mounted to the bottom interior surface of the housing 12, and includes electronics (e.g., a processor and a controller) necessary for controlling and monitoring the latch 10. A sensor 34 is mounted to the circuit board 32 and is positioned and configured to sense the presence or absence of the input cam 44 of the trigger 16 that resides thereabove. The sensor 34 may be an optical detector, for example. Another sensor 36 is mounted to the circuit board 32 for detecting the angular position of tabs 50 extending from the output cam 42. The sensor 36 may be a magnetic sensor, for example. The sensors 34 and 36 may be capacitive-type, inductive-type, optical-type, magnetic-type, or mechanical-type.

The latch 10 is designed to be electrically operated, and actuated via an electrical input signal, or wireless communication via a Bluetooth® compatible device. Independent sensors provide electrical/wireless latch and door status, and the latch can be held in the unlatched state (e.g., electrically, wirelessly or mechanically) until re-latching is desired.

A motor 40 is mounted above the circuit board 32 and receives power therefrom for unlocking the latch. It should be understood that the motor 40 is not employed for closing the pawl 14 of the latch 10. The latch is mechanically considered a "slam to close" type latch, which does not require an electrical or wireless signal to initiate closing. The motor 40 has an output shaft 41 that is non-rotatably connected to an output cam 42 for rotating the output cam 42. The output cam 42 is configured to engage an input cam 44 that forms part of the trigger 16. The motor 40 is configured to rotate the output shaft 41 in a single direction, as depicted by the arrows in FIG. 2, however, the motor 40 could be configured to rotate in two different directions, if so desired. The motor shaft 41 is configured to rotate, but not translate.

The latch 10 includes components that are also used in other standard rotary latches, thereby providing cost efficiencies.

Referring now to various individual components of the latch 10, as best shown in FIGS. 3A-3F, the output cam 42 of the motor 40 includes a hollow cylindrical shaft 46 having a non-circular (D-shaped) opening 48 for non-rotatably connecting to the output shaft 41 of the motor 40. Two opposing tabs 50 extend radially from the outer perimeter of the shaft 46. The sensor 36 on the circuit board detects the presence or absence of the tabs 50, thereby enabling the processor of the latch 10 to calculate the angular position of the output cam 42.

Figure 3C:
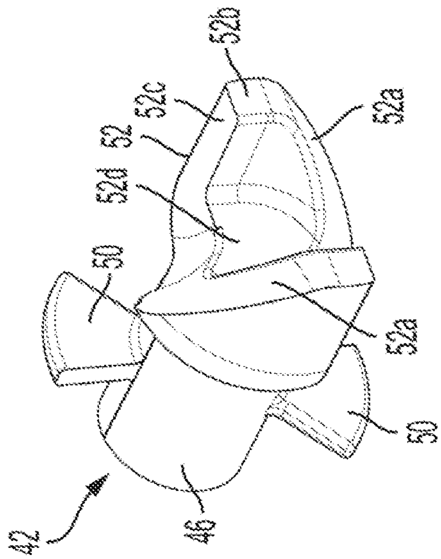
FIGS. 3A-3D are isometric views of an output cam of the latch of FIG. 1A.
Figure 3G:
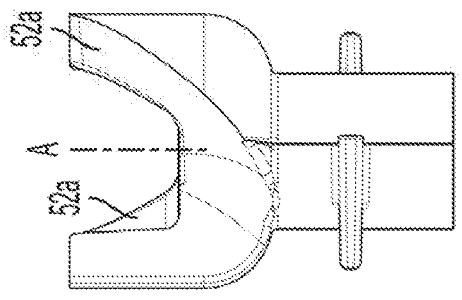
FIGS. 3E-3G are front, right and left side elevation views of the output cam.
Figure 3B:
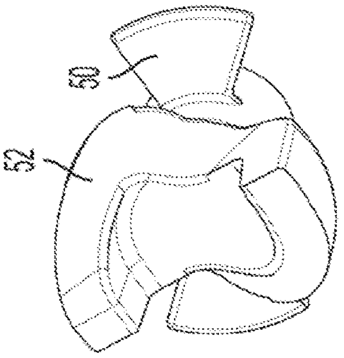
Figure 3F:
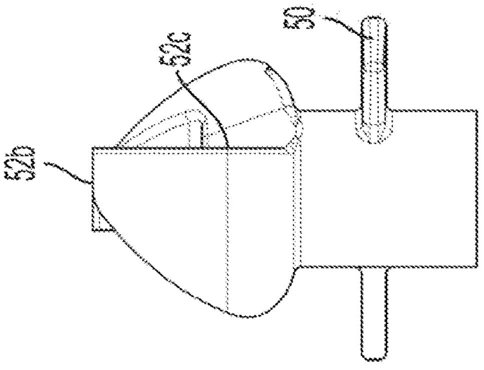
Figure 3A:
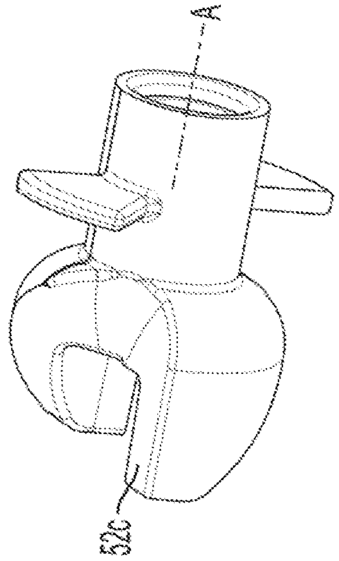
Figure 3E:
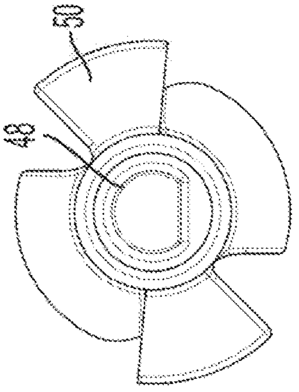
Figure 3D:
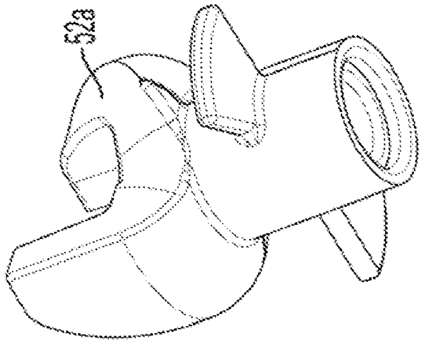

Two gear teeth 52 extend axially from the shaft 46. The teeth 52 are substantially identical and are spaced apart by 180 degrees about the axis A of rotation. Each tooth 52 includes a curved ramp portion 52*a*, flat bearing surface 52*c*, and a straight portion 52*c*. The curved ramp portion 52*a* is a curved surface that extends helically about axis A (i.e., both axially along axis A and circumferentially about axis A). The distal end of the ramp portion 52*a* intersects the flat bearing surface 52*b* at the distal end of the tooth 52. The flat bearing surface 52*b* is a flat surface that is oriented orthogonal to axis A and extends circumferentially about axis A. One end of the flat bearing surface 52*b* intersects the curved ramp portion 52*a*, as stated previously, and the opposite end of the flat bearing surface 52*b* intersects the straight portion 52*c*. The straight portion 52*c* is a flat surface that extends in an axial direction and parallel to the axis A. A circumferentially extending space or gap 52*d* is disposed between the straight portion 52*c* of one tooth 52 and the ramped surface 52*a* of the other tooth 52, as best shown in FIG. 3C. It should be understood that the number of teeth 52 can vary.

As best shown in FIG. 1F, the pawl 14 is a flat member that includes an opening 14*a* for receiving the pin 18*a*, an opening 14*b* for receiving the second end 30*b* of the link 30, and a semi-circular recess 14*c* formed on its outer perimeter for retaining a striker 50 (shown in FIG. 5A) within the interior of the latch 10. The pawl 14 also includes a bearing surface 14*d* on its outer perimeter for engaging with the trigger 16 (see, e.g., FIG. 5A). The bearing surface 14*d* may be an exterior corner or convex surface defined on the outer perimeter.

Turning now to FIGS. 4A-4H, the trigger 16 has a first portion 60 that interacts with the pawl 14, a second portion 62 that interacts with the output cam 42, and a third portion 64 (also referred to as an 'extension') that is provided for manual or remote actuation of the trigger 16.

More particularly, the first portion 60 is a substantially flat plate in which the opening 16*a* and the slot 16*b* are formed. A stop 66 is formed on the top end of the first portion 60 for engaging the housing 12 to limit counterclockwise motion of the trigger 16 (as viewed in FIG. 5A) beyond a predetermined point. A heel 68 is formed on an exterior-facing (i.e., facing the exterior of the housing 12) perimeter side of the first portion 60, and the heel 68 may be configured for engaging the housing 12 to limit clockwise motion of the trigger 16 (as viewed in FIG. 5A) beyond a pre-determined point. A bearing surface 70 in the form of an interior corner is disposed on an interior-facing perimeter side of the first portion 60 for engaging with the bearing surface 14*d* of the pawl 14 to maintain the pawl 14 in a locked state. The bearing surface 70 may be a concave surface, recess, cut-out or relief formed on the outer perimeter of the trigger 16. A curved nose portion 72 protrudes from the perimeter of the first portion 60 at a location adjacent the bearing surface 70 and may form part of the bearing surface 70.

The second portion 62 of the trigger 16 includes the input cam 44, which is overmolded onto the second portion 62 of the trigger 16. The input cam 44 may be a plastic overmolded part on the trigger 16, and the trigger 16 may be formed of metal or plastic, for example. Alternatively, the trigger 16 and the input cam 44 could be cast or injection molded as a unitary one-piece component.

Figure 4C:
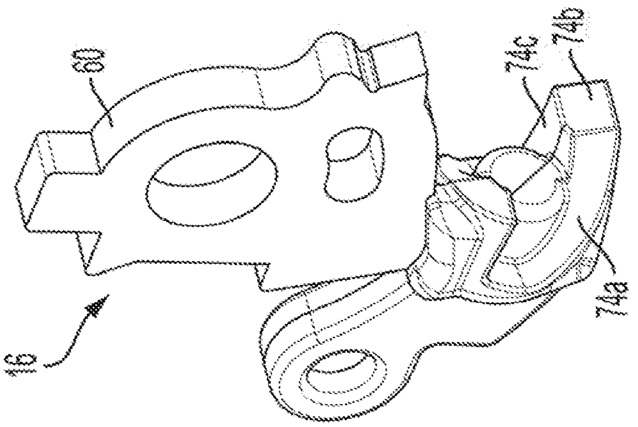
FIGS. 4A-4D are isometric views of a trigger of the latch of FIG. 1A.
Figure 4B:
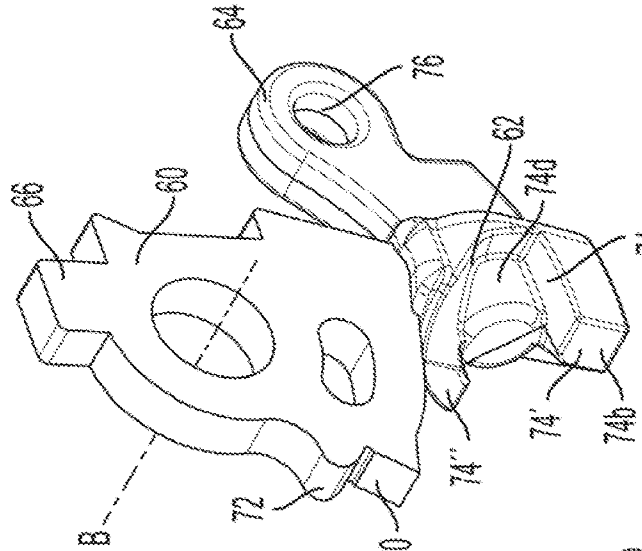
Figure 4E:
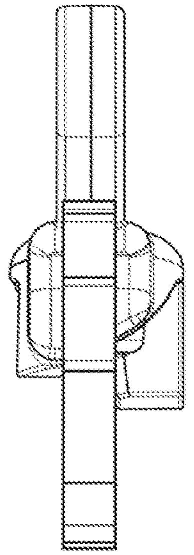
FIGS. 4E-4H are top plan, front elevation, rear elevation and right side elevation views of the trigger.
Figure 4A:
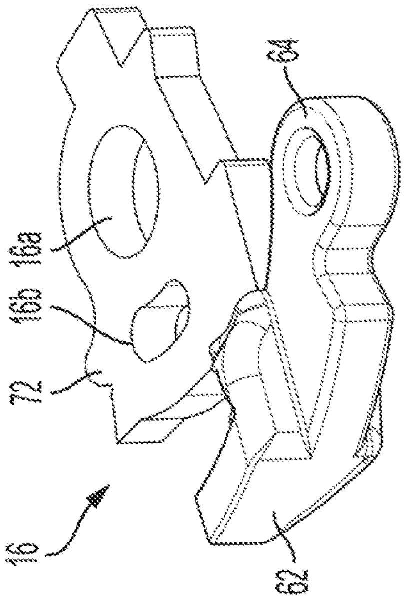
Figure 4D:
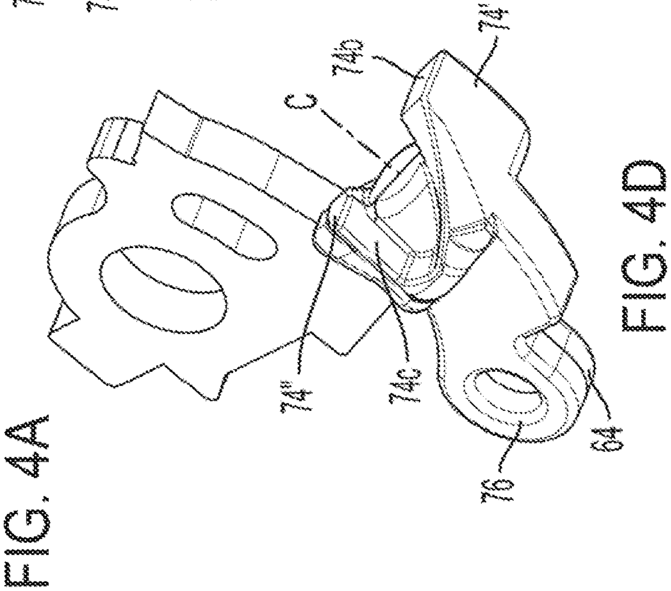
Figure 4H:
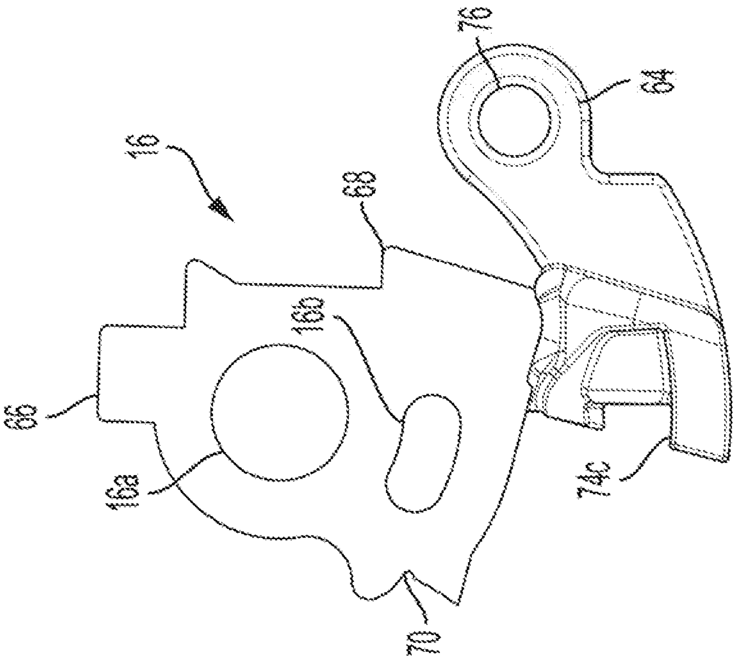
Figure 4G:
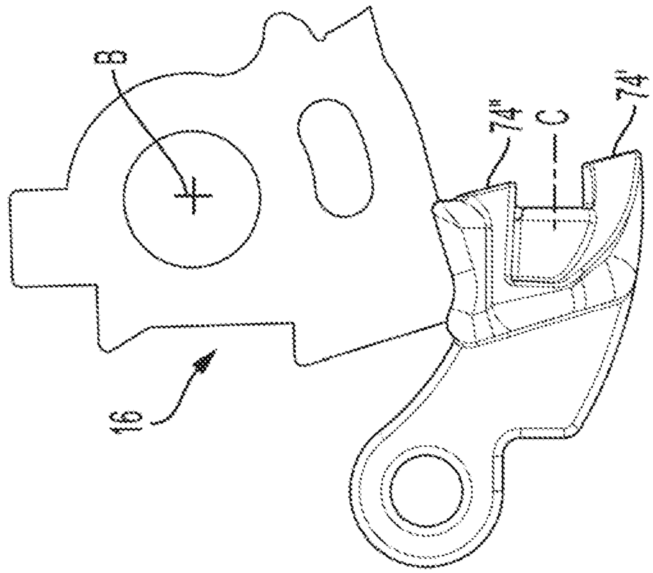
Figure 4F:
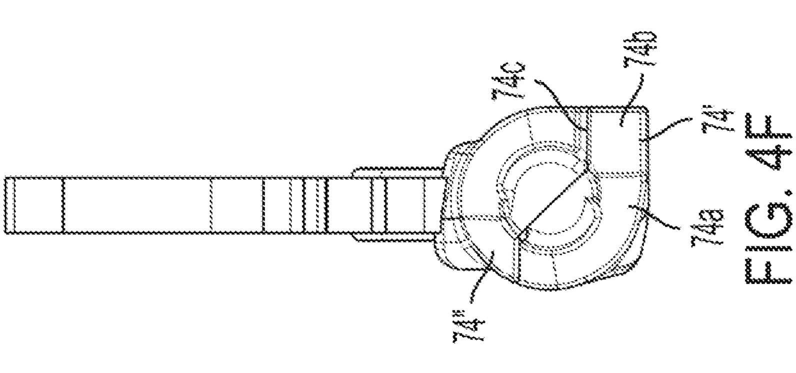

The input cam 44 comprises two gear teeth 74' and 74" (referred to either individually or collectively as teeth 74 or tooth 74) for mating with the gear teeth 52 of the output cam 42. The teeth 74 are structurally similar and are spaced apart by 180 degrees about a longitudinal axis C. As best shown in FIG. 4G, the lower tooth 74' extends further from the body of the trigger and along the axis C than the upper tooth 74". Each tooth 74 includes a curved ramp portion 74*a*, flat bearing surface 74*c*, and a straight portion 74*c*. The curved ramp portion 74*a* is a curved surface that extends helically about axis C (i.e., both axially along axis C and circumferentially about axis C). The distal end of the ramp portion 74*a* intersects the flat bearing surface 74*b* at the distal end of the tooth 74. The flat bearing surface 74*b* is a flat surface that is oriented orthogonal to axis C and extends circumferentially about axis C. One end of the flat bearing surface 74*b* intersects the curved ramp portion 74*a*, as stated previously, and the opposite end of the flat bearing surface 74*b* intersects the straight portion 74*c*. The straight portion 74*c* is a flat surface that extends in an axial direction and parallel to the axis C. A circumferentially extending space or gap 74*d* is disposed between the straight portion 74*c* of one tooth 74 and the ramped surface 74*a* of the other tooth 74. It should be understood that the number of teeth 74 can vary.

The teeth 74 of the input cam 44 are specially configured such that the ramp portions 74*a* of the teeth 74 continually slide over the ramped portions 52*a* of the teeth 52 of the output cam 42 and maintain continuous surface contact therewith as the output cam 42 rotates about axis A while the input cam 44 rotates about axis B. The axes A and B are orthogonal to one another. More generally, the axes A and B are non-parallel with respect to one another.

Figure 14:
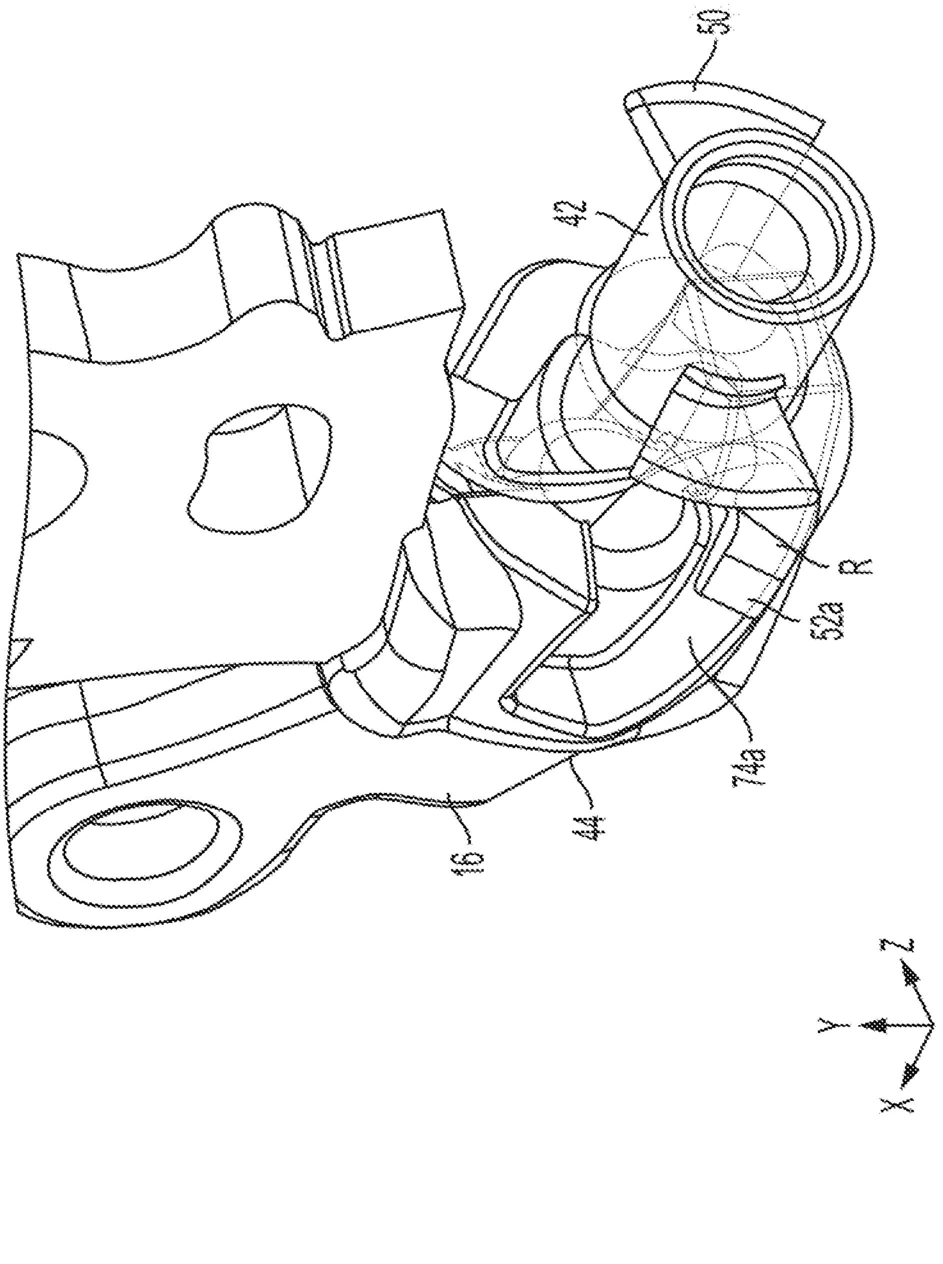
FIG. 14 depicts sliding engagement between the output cam of the motor and the input cam of the trigger.

FIG. 14 depicts the ramp portions 74*a* of the teeth 74 sliding over the ramped portions 52*a* of the teeth 52 of the output cam 42. The area of contact is designated with the numeral 'R.' There exists constant surface contact (R) between the ramp portions 74*a* and 52*a* as the axes A and C become non-parallel during rotation of the trigger 16 between its locked and unlocked positions. The unique design of drive cam/output cam profiles, enable the efficient transfer of forces with two degrees of rotation simultaneously.

Referring back to FIGS. 4A-4H, the third portion 64 of the trigger 16 includes a semi-circular segment that protrudes outwardly from the second portion 62. In assembled form of the latch 10, the third portion 64 extends at least partially outside of the housing 12 (see FIG. 1A). The third portion 64 includes an opening 76 for attaching to a cable, for example. The third portion 64 of the trigger 16 can be used for manual or remote actuation of the trigger 16. Specifically, the trigger 16 can be actuated manually by directly pulling on the exposed third portion 64, or remotely by using a flexible cable connected to the opening 76 to pull on the trigger 16. Manually or remotely pulling the trigger 16 while the pawl 14 is in the closed and locked state will cause the trigger 14 to release the pawl 14, and the pawl 14 can thereafter move to the open and unlocked state once the striker is moved out of the latch 10.

Turning now to operation of the latch 10, a sequence of operational steps, according to one exemplary method of operation, is depicted in FIGS. 5A-13B. It should be understood that the steps can vary from that which are shown and described.

The latch 10 is configured to operate in at least two different modes, namely, a "Re-Lock Mode" and a "Delayed Re-Lock Mode." FIGS. 5A-8B and 11A-13B apply to the Re-Lock Mode, whereas FIGS. 5A-13B apply to the Delayed Re-Lock Mode. Briefly, in the Re-Lock Mode, the latch 10 is configured such that the user is capable of closing a drawer, door or panel to lock the latch 10, whereas, in the Delayed Re-Lock Mode, the user is capable of closing a drawer, door or panel without locking the latch 10, however, the latch 10 will automatically lock after a pre-determined amount of time.

The Re-Lock Mode is useful in a situation where it is desired to permit one-time access to the contents of the drawer. For example, after a user opens and then closes the drawer, the user cannot re-open the drawer because it is locked by the latch. The Delayed Re-Lock Mode is useful in a situation where it is desired to permit access to the contents of the drawer for a pre-determined period of time. For example, users can freely open and close the unlocked drawer for the pre-determined period of time. Once the pre-determined period of time expires, the latch locks the drawer in the closed position, thereby preventing further access to the contents of the drawer.

Figure 5A:
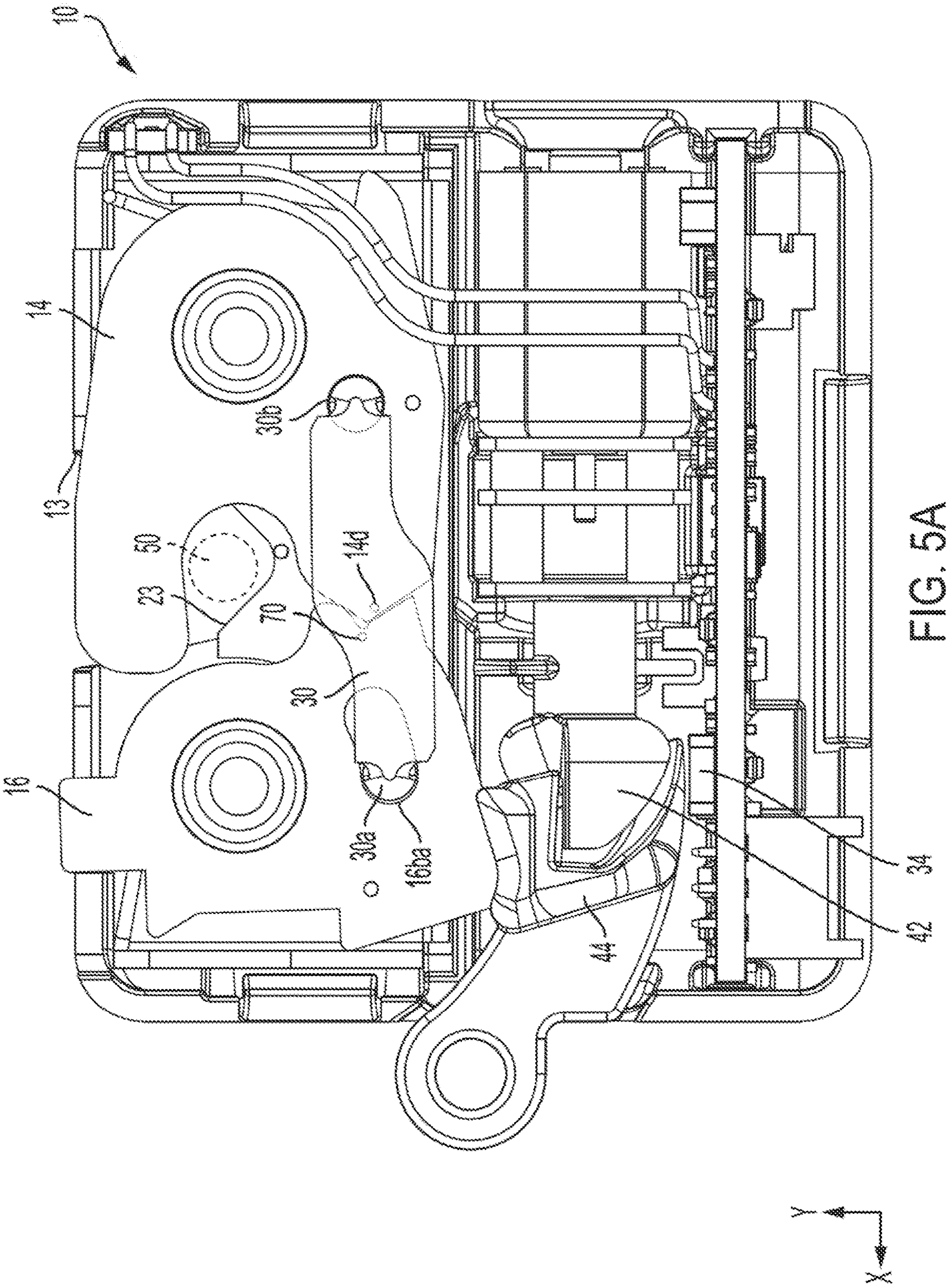
Figure 5B:
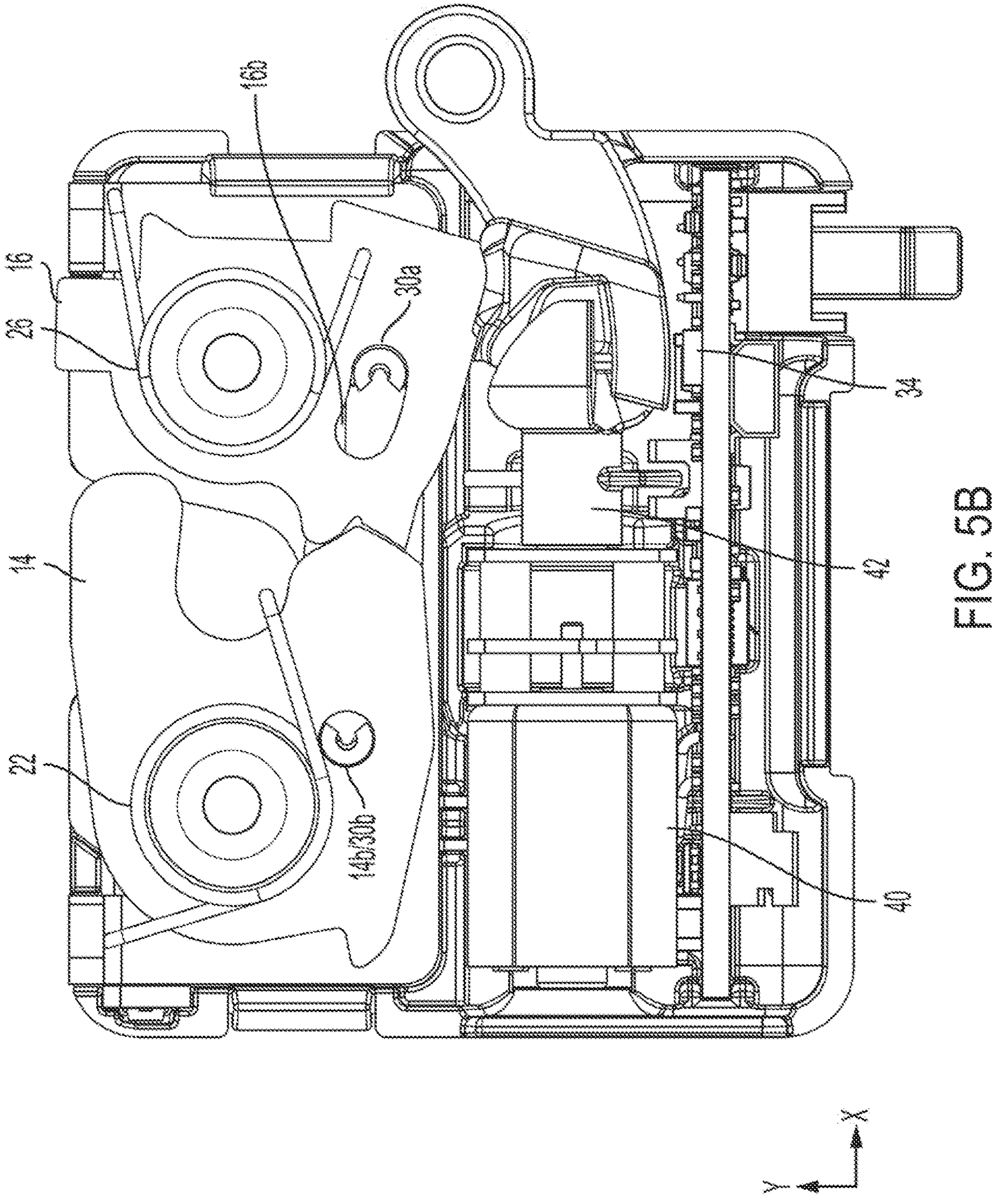

FIGS. 5A and 5B depict rear and front elevation views, respectively, of the latch 10 of FIGS. 1A-1E shown in a closed and locked configuration. In the closed and locked position of the latch 10, the cams 42 and 44 are fully engaged with one another. More particularly, the teeth 74 of the input cam 44 are positioned in the circumferentially extending spaces between the teeth 52 of the output cam 42, and vice versa. The position sensor 34 detects the presence of the lower end of the input cam 44 of the trigger 16, thereby indicating that the latch 10 is maintained in a locked state. The bearing surface 70 of the trigger 16 is engaged with the bearing surface 14*d* of the pawl 14, thereby holding the pawl 14 in the locked position. The striker 50 of the door, panel, or drawer (for example) is captured between the pawl 14 and the stop 23. Thus, the striker 50 is incapable of being pulled out of the latch 10 in an upward direction (as viewed in FIG. 5A) without physically deforming or breaking the latch 10. The end 30*a* of the link 30 is positioned at the end 16*ba* of the slot 16*b* formed in the trigger 16.

Figure 6A:
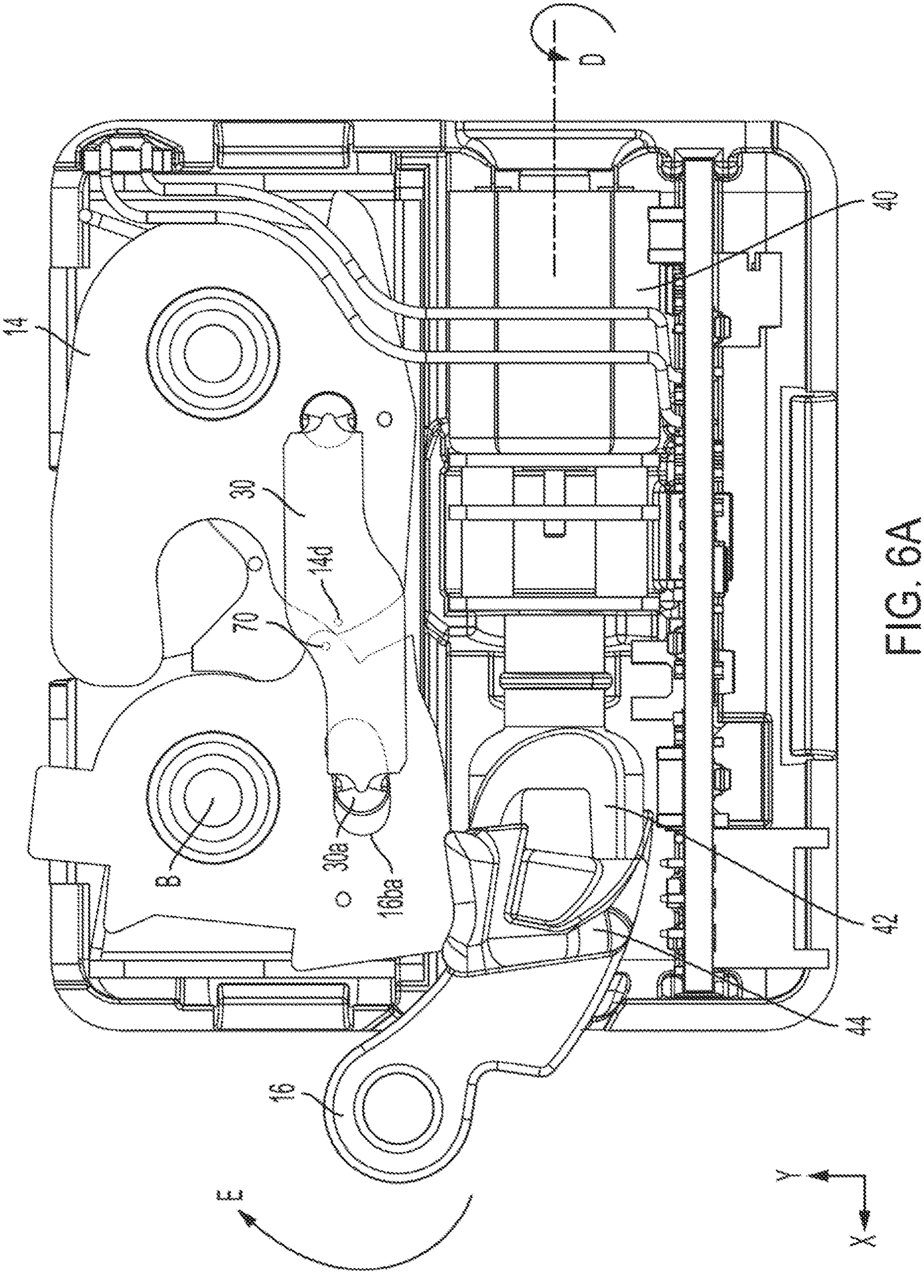
FIGS. 6A and 6B depict rear and front elevation views, respectively, of the latch of FIGS. 1A-1E shown in a closed and locked configuration, wherein the output cam is beginning to move the trigger.
Figure 6B:
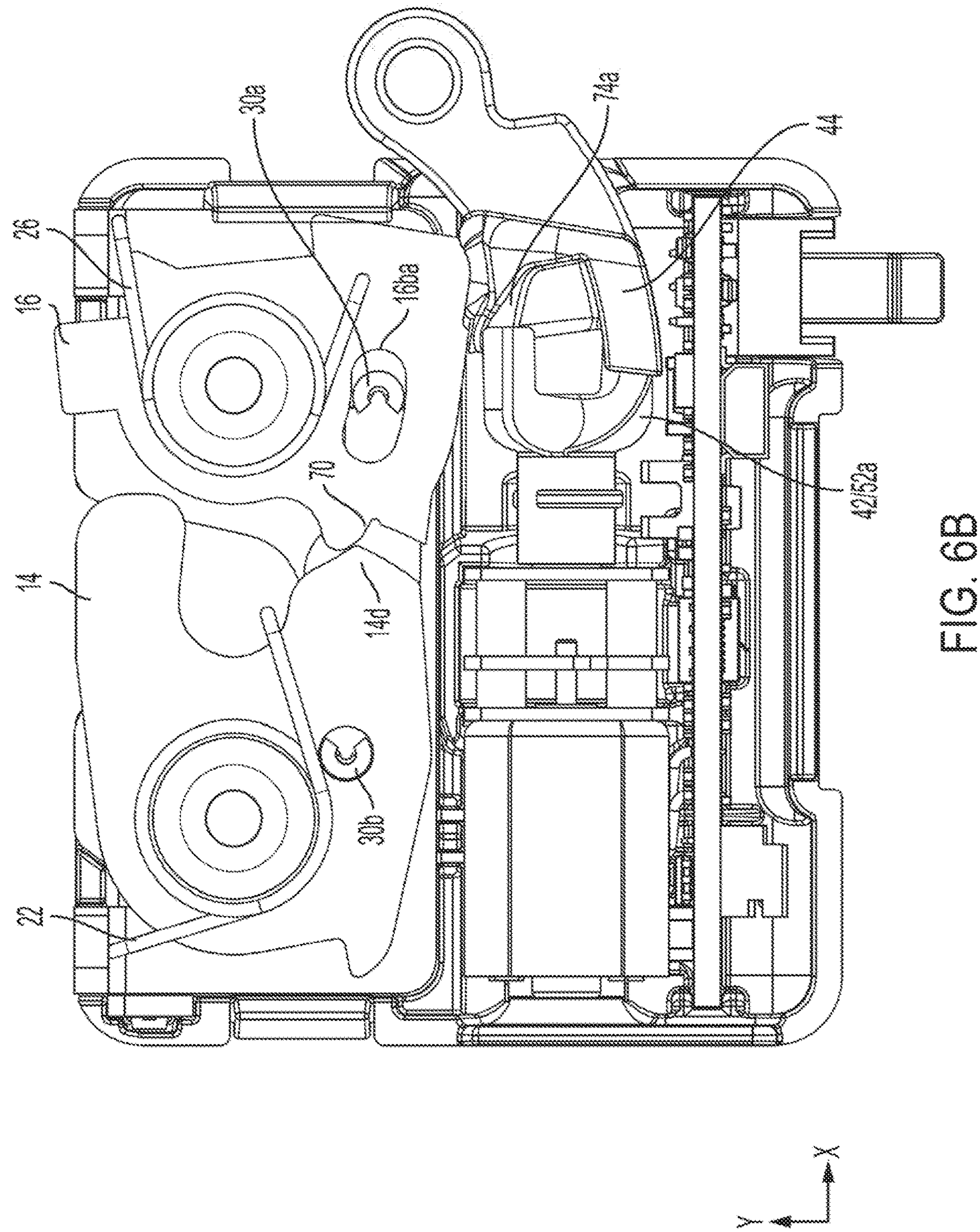

FIGS. 6A and 6B depict rear and front elevation views, respectively, of the latch 10 shown in a closed and locked configuration, wherein the output cam 42 begins to rotate the trigger 16 away from the locked position. More particularly, a signal sent by the processor activates the motor 40, and the output shaft 41 of the motor 40 rotates the output cam 42. The output cam 42 rotates in the direction D shown in FIG. 6A, which causes the trigger 16 to rotate in the direction E and about axis B. The trigger 16 rotates away from its locked position against the bias of the spring 26. The trigger 16 rotates with respect to the link 30 such that the pin 30*a* of the link 30 travels along the length of the slot 16*b* of the trigger 16 and separates from the end 16*ba* of the slot 16*b*. Rotation of the output cam 42 causes the ramp portions 74*a* of the teeth 74 to slide over respective ramped portions 52*a* of the teeth 52 of the output cam 42, which results in rotation of the trigger 16 in the direction E. At this stage, the latch 10 is still in a locked state because the bearing surface 70 of the trigger remains slightly engaged with the bearing surface 14*d* of the pawl 14. Also, the position sensor 34 still detects the presence of the lower end of the input cam 44 of the trigger 16. Although not shown, the striker 50 is still retained by the pawl 14 in a locked state. Further movement of the trigger 16 in the direction E, however, will cause the bearing surface 70 of the trigger to disengage from the bearing surface 14*d* of the pawl 14, and, the position sensor 34 will no longer detect the presence of the lower end of the input cam 44 of the trigger 16.

Figure 7A:
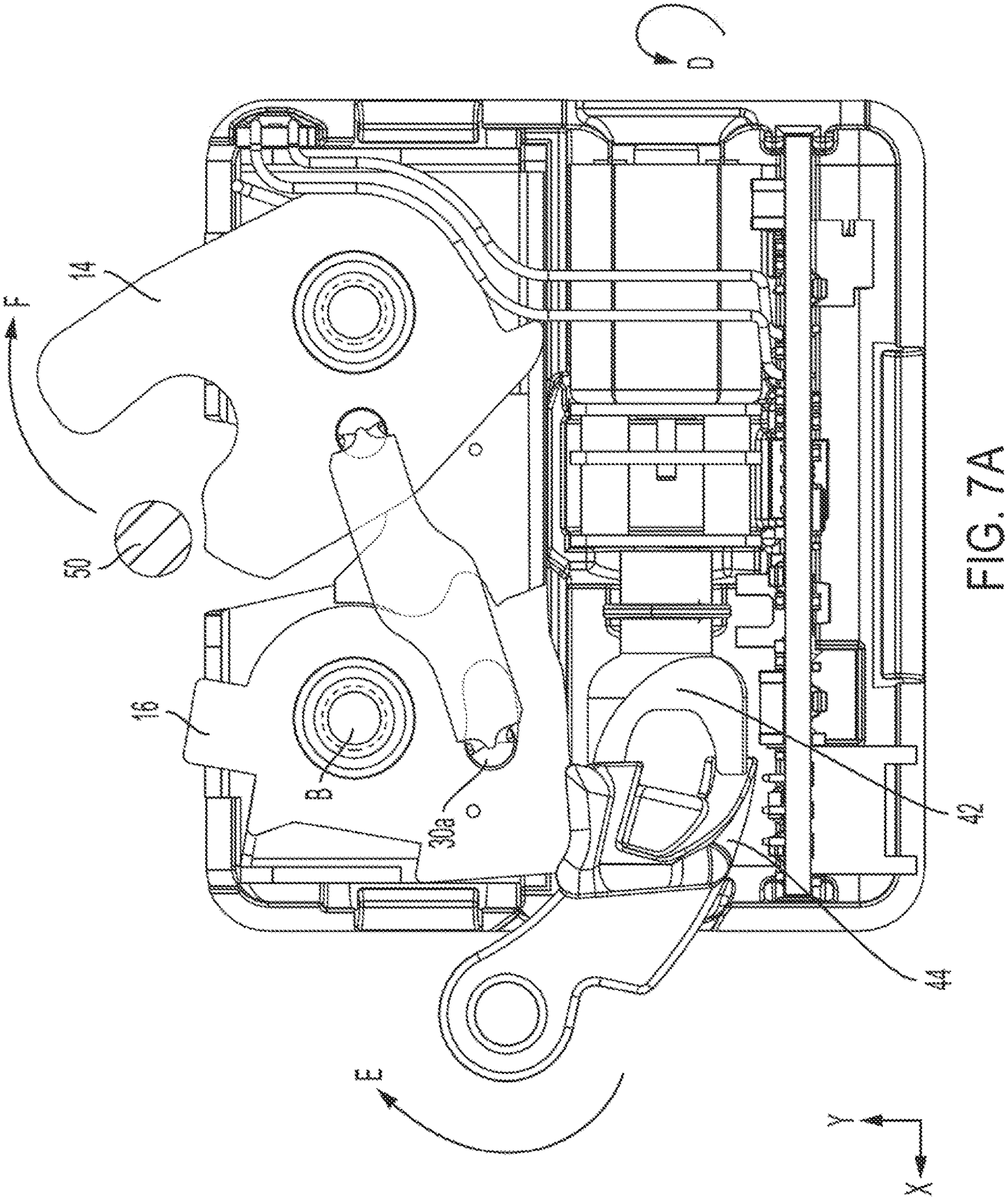
FIGS. 7A and 7B depict rear and front elevation views, respectively, of the latch of FIGS. 1A-1E shown in an open and unlocked configuration.
Figure 7B:
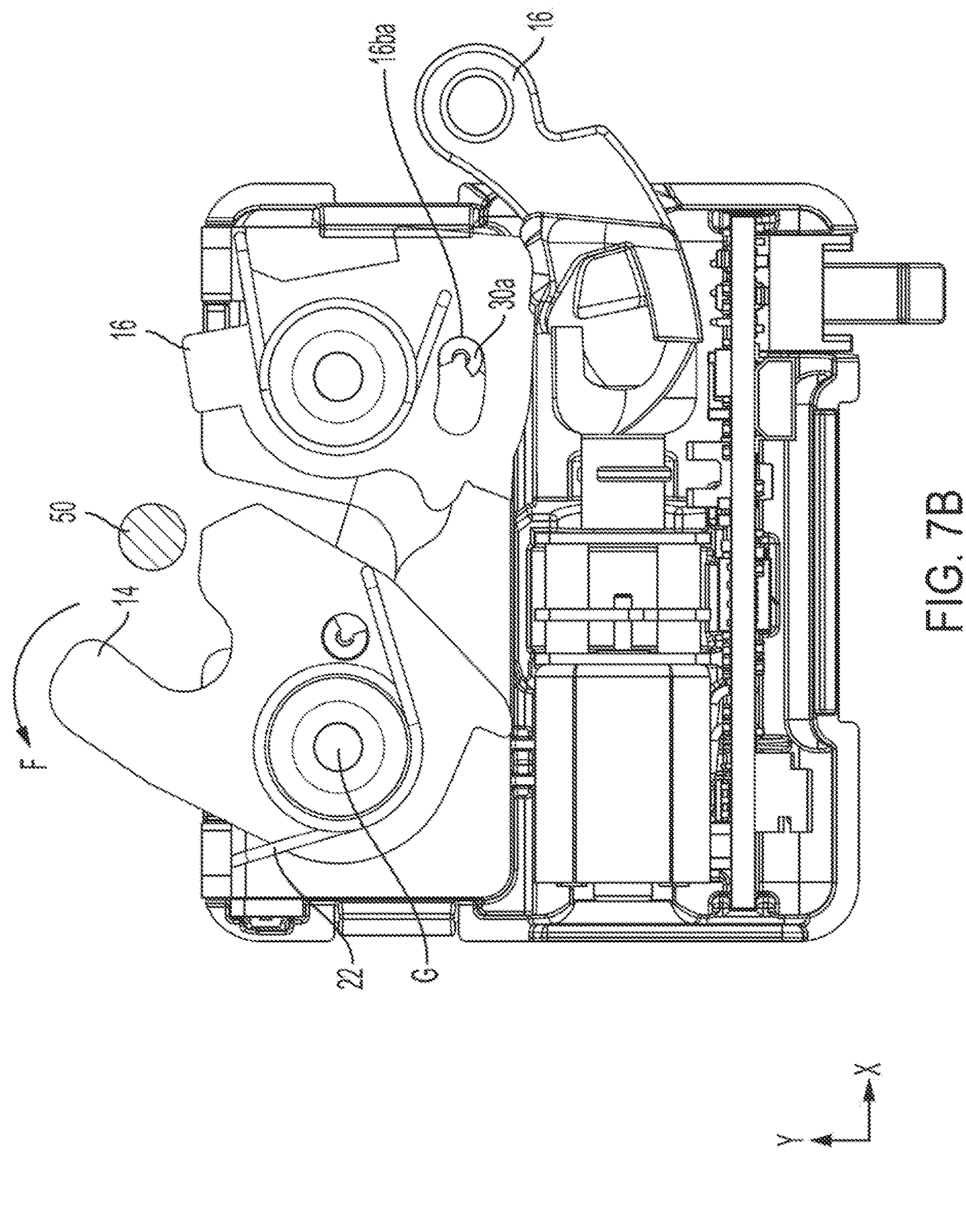

FIGS. 7A and 7B depict rear and front elevation views, respectively, of the latch 10 shown in an open and unlocked state. More particularly, the output cam 42 continues to rotate in the direction D shown in FIG. 6A, which causes the trigger 16 to continue to rotate in the direction E and about axis B against the bias of the spring 26. The bearing surface 70 of the trigger completely disengages from the bearing surface 14*d* of the pawl 14, and, the position sensor 34 no longer detects the presence of the lower end of the input cam 44 of the trigger 16, thereby indicating that the latch 10 is an in unlocked state.

Once the trigger 16 releases the pawl 14, the spring 22 will rotate the pawl 14 in the direction F about axis G if either (i) the striker 50 is not positioned within the latch 10, or (ii) the force of the spring 22 can overcome the weight of the striker 50 and the drawer to which the striker 50 is attached. If the force of the spring 22 cannot overcome the weight of the striker 50 and the drawer to which the striker 50 is attached, then the spring 22 will rotate the pawl 14 to rotate in the direction F about axis G once the striker 50 is removed from the latch 10. The pawl 14 is then in an open position and is again ready to receive the striker. In the state shown in FIGS. 7A and 7B, the ramp portions 74*a* of the teeth 74 of the input cam 44 remain positioned on respective ramped portions 52*a* of the teeth 52 of the output cam 42. Also, in the state of FIGS. 7A and 7B, the pin 30*a* of the link 30 nearly contacts the end 16*ba* of the slot 16*b* of the trigger 16.

Figure 8A:
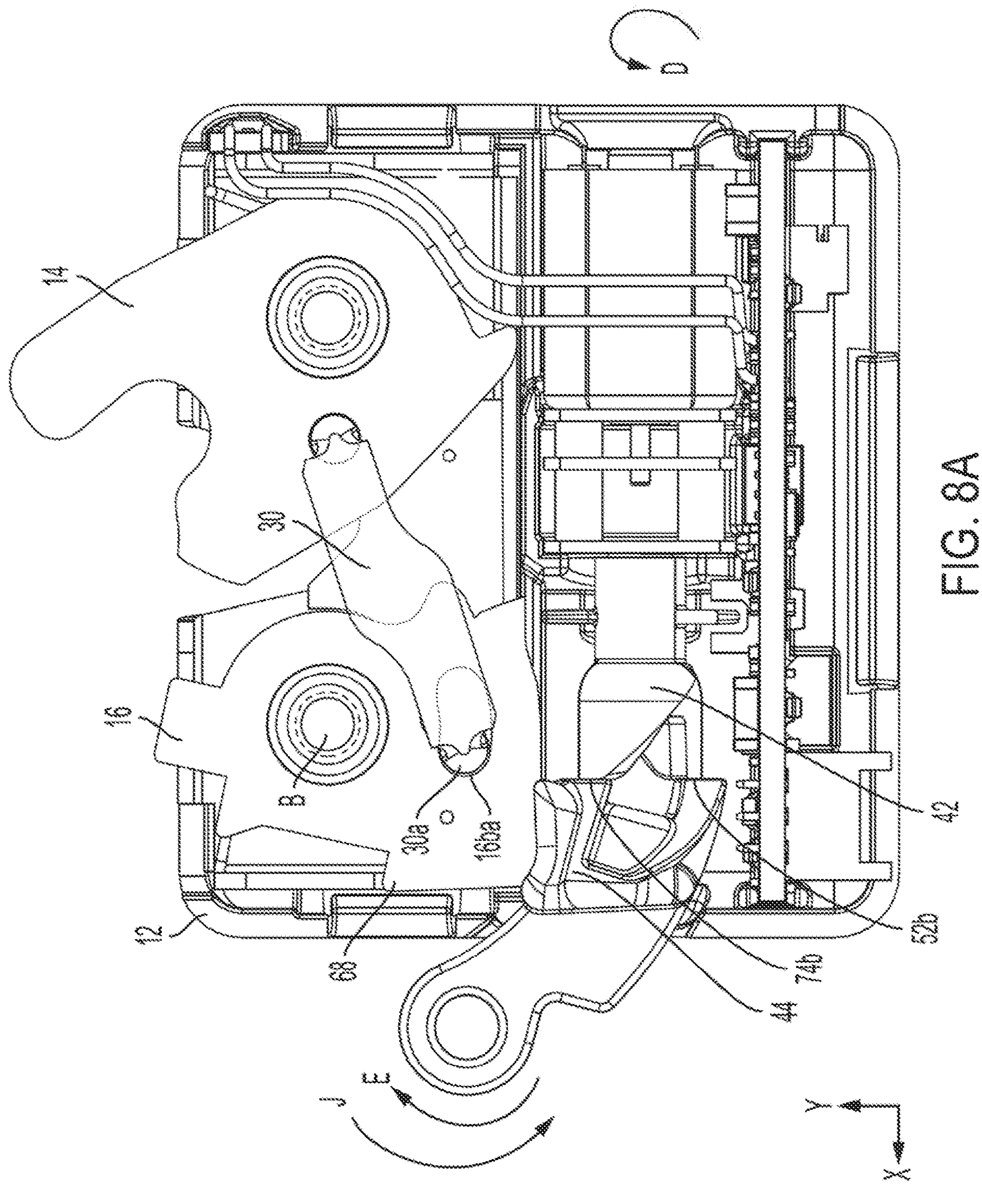

FIGS. 8A and 8B depict rear and front elevation views, respectively, of the latch 10 shown in an open and unlocked configuration. The output cam 42 continues to rotate in the direction D shown in FIG. 6A, which causes the trigger 16 to continue to rotate in the direction E and about axis B against the bias of the spring 26. At this stage, the ramp portions 74*a* of the teeth 74 have completely slid over respective ramped portions 52*a* of the teeth 52 of the output cam 42, and the flat bearing surfaces 52*b* of the teeth 52 of the output cam 42 are positioned against the flat bearing surfaces 74*b* of the teeth 74 of the input cam 44 of the striker 16. Due to the bearing engagement between the surfaces 52*b* and 74*b*, the striker 16 is prevented from rotating in direction J toward the locked position under the bias of the spring 26. Accordingly, in the state of FIGS. 8A and 8B, the position sensor 34 does not detect the input cam 44 and the processor of the latch 10 understands that the latch 10 is unlocked. Additionally, the pin 30*a* of the link 30 bears on the end 16*ba* of the slot 16*b* of the trigger 16, and the heel 68 of the trigger 16 bears on an interior surface of the housing 12.

Figure 9:
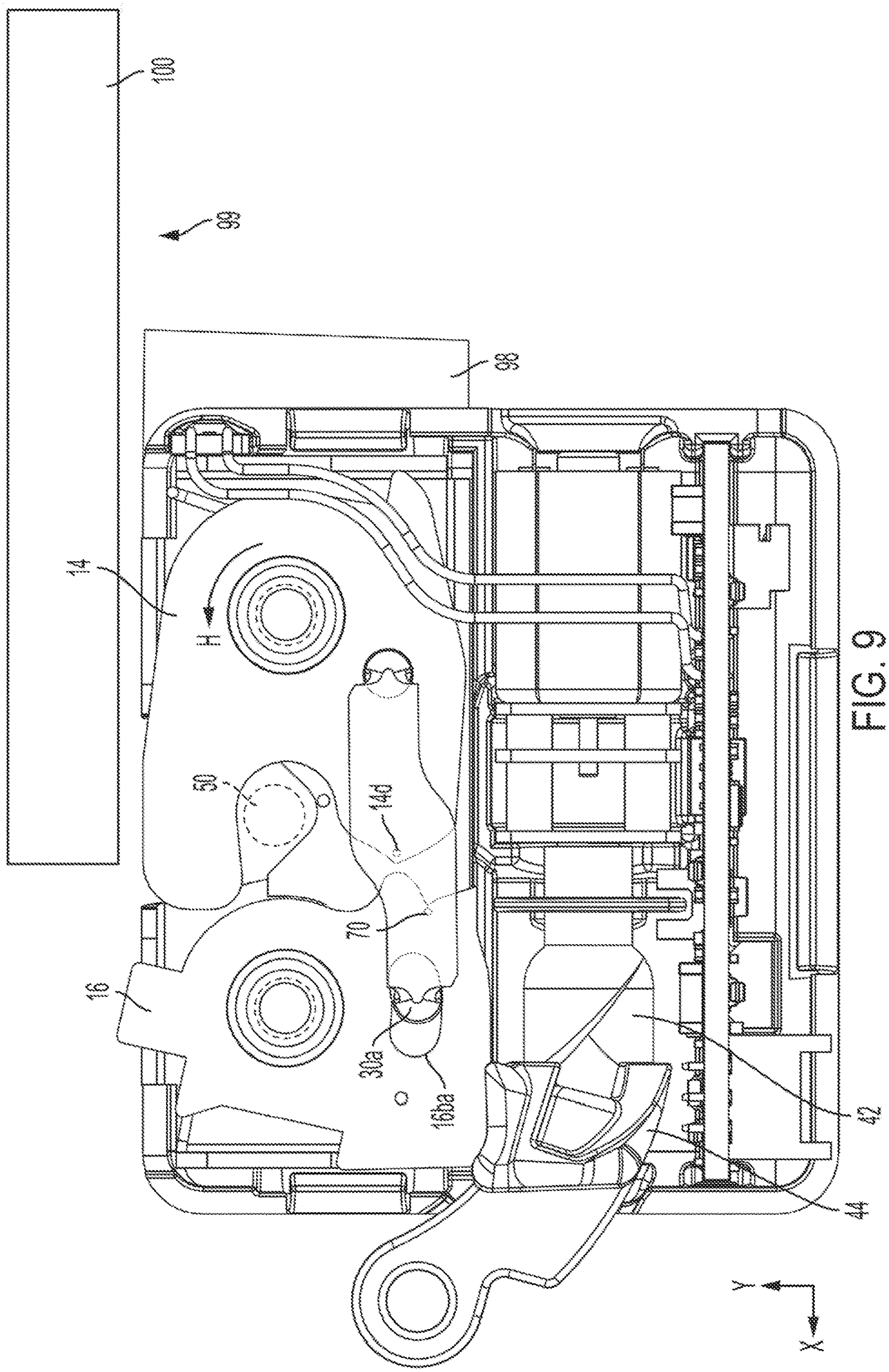
Figure 10:
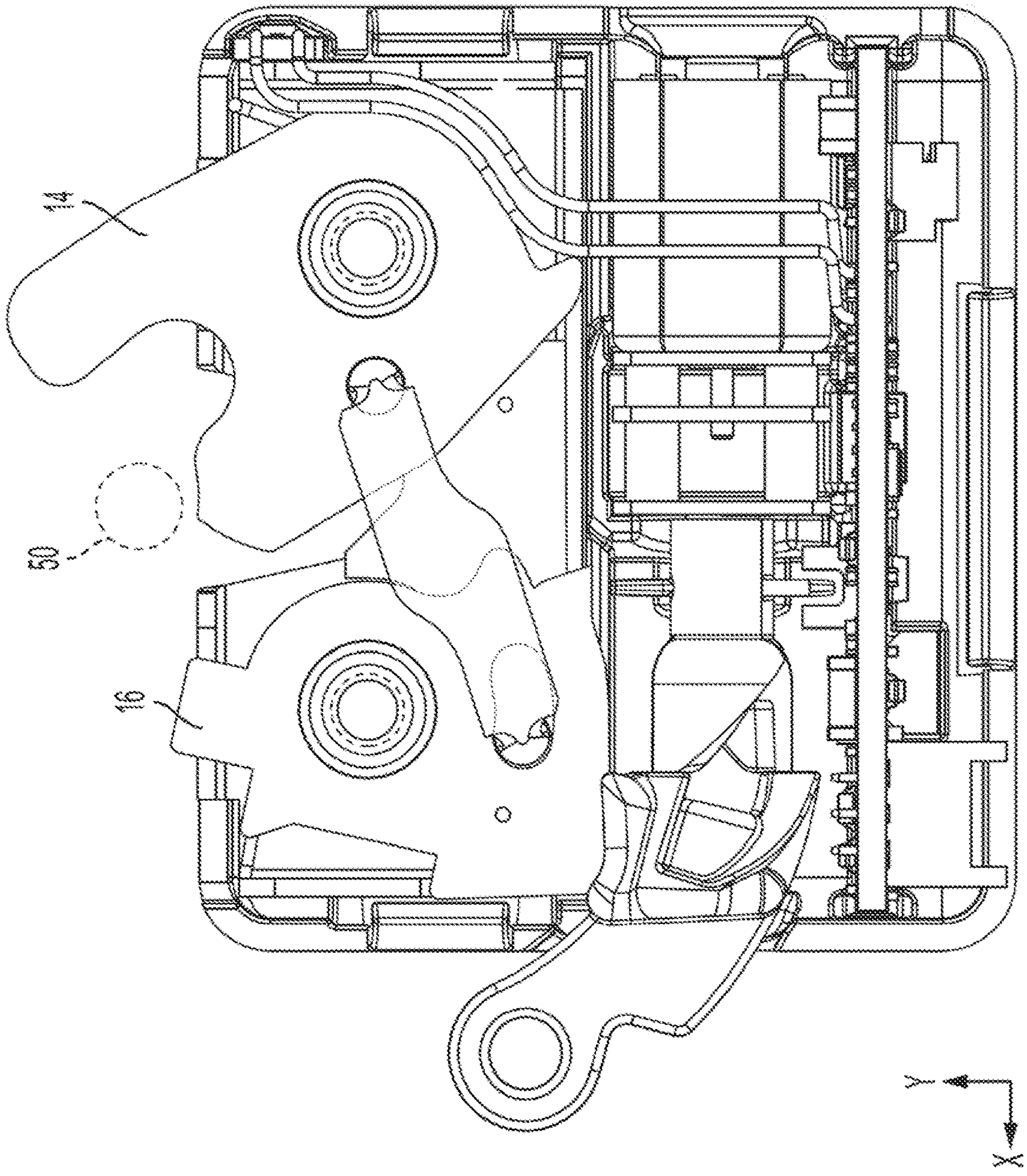

If the latch 10 is operated in a delayed re-lock mode, then the motor 40 stops rotation, and the latch 10 is maintained in the position shown in FIGS. 8A and 8B for a pre-determined period of time. FIGS. 9 and 10 depict a rear side view of the latch of FIG. 8A operated in a "delayed re-lock" mode and illustrate what would occur if a striker were to engage (FIG. 9) and then disengage (FIG. 10) the pawl when the latch is maintained in an unlocked configuration. Turning to FIG. 9, in the delayed re-lock state, when the striker 50 is inserted into the latch 10 (as shown in FIG. 9), the striker 50 rotates the pawl 14 in direction H while the trigger 16 remains stationary and the pin 30*a* of the link 30 freely slides in the slot 16*b*. In the position shown in FIG. 9, the bearing surface 70 of the trigger 16 is separated from the bearing surface 14*d* of the pawl 14, thereby preventing the trigger 16 from locking the pawl 14 in a locked position. Thus, in the state of FIG. 9, the latch 10 closes without locking. This is because the trigger 16 is prevented from rotating to the locked position by the bearing engagement between the cams 42 and 44. The drawer (for example) to which the trigger 50 is attached can be removed from the latch 10, as shown in FIG. 10, and the pawl 14 and the trigger 16 return to their initial positions shown in FIG. 10.

Figure 11A:
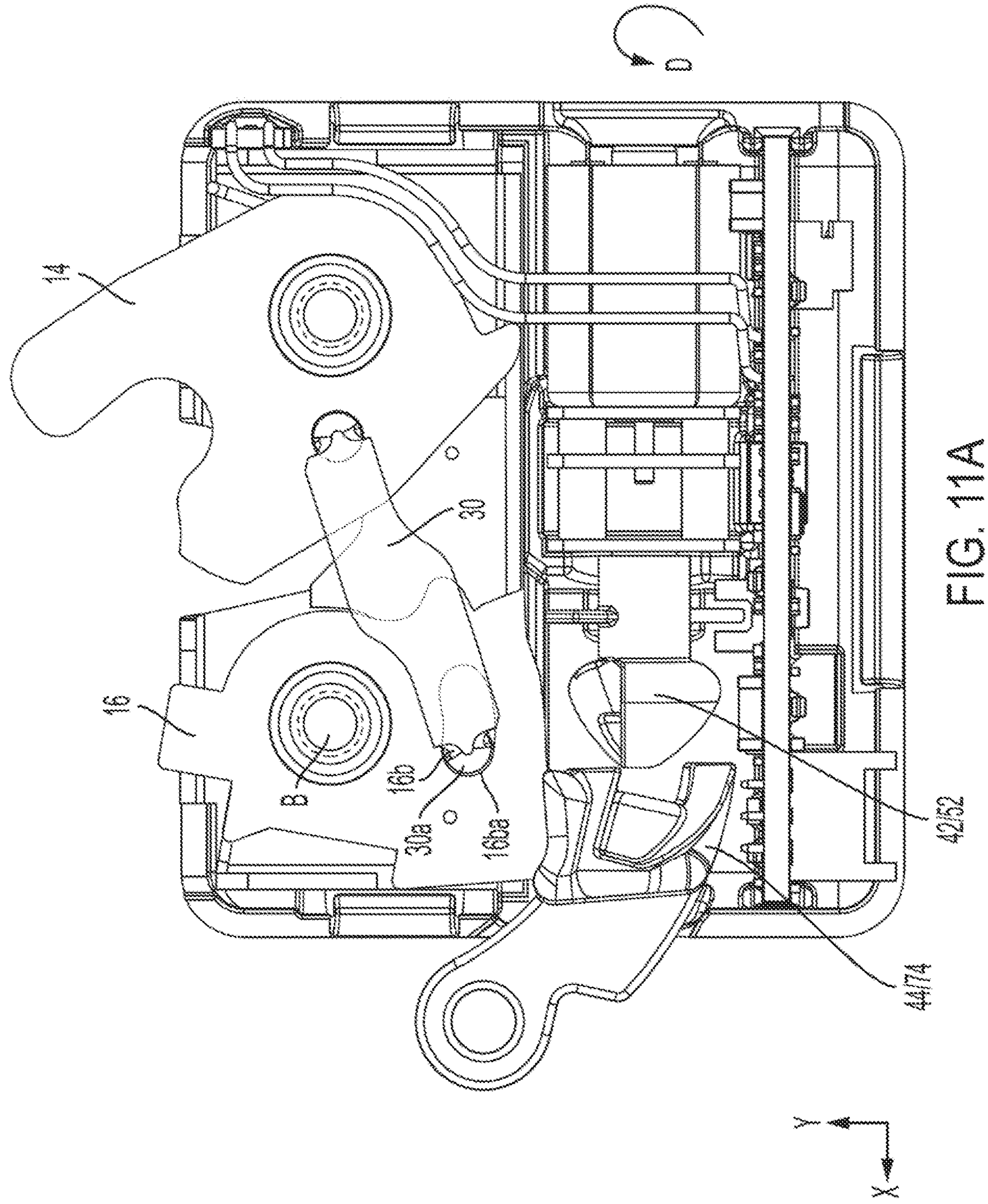
FIGS. 11A and 11B depict rear and front elevation views, respectively, of the latch of FIGS. 1A-1E shown in an open and pre-locked configuration, wherein the cams are rotationally positioned to permit rotation of the trigger toward the locked position.

After the pre-determined period of time has elapsed, however, the motor 40 will rotate the output cam 42 in the direction D to the position shown in FIG. 11A. If the striker 50 is positioned within the latch 10 when the motor rotates the output cam 42 to the position shown in FIG. 11A, then the striker 50 will be locked within the latch 10. If the striker 50 is not positioned within the latch 10 at the time that the motor rotates the output cam 42 to the position shown in FIG. 11A, then the pawl 14 will remain in an open position, and will only close and lock after a striker 50 is reinserted into the latch 10.

Figure 11B:
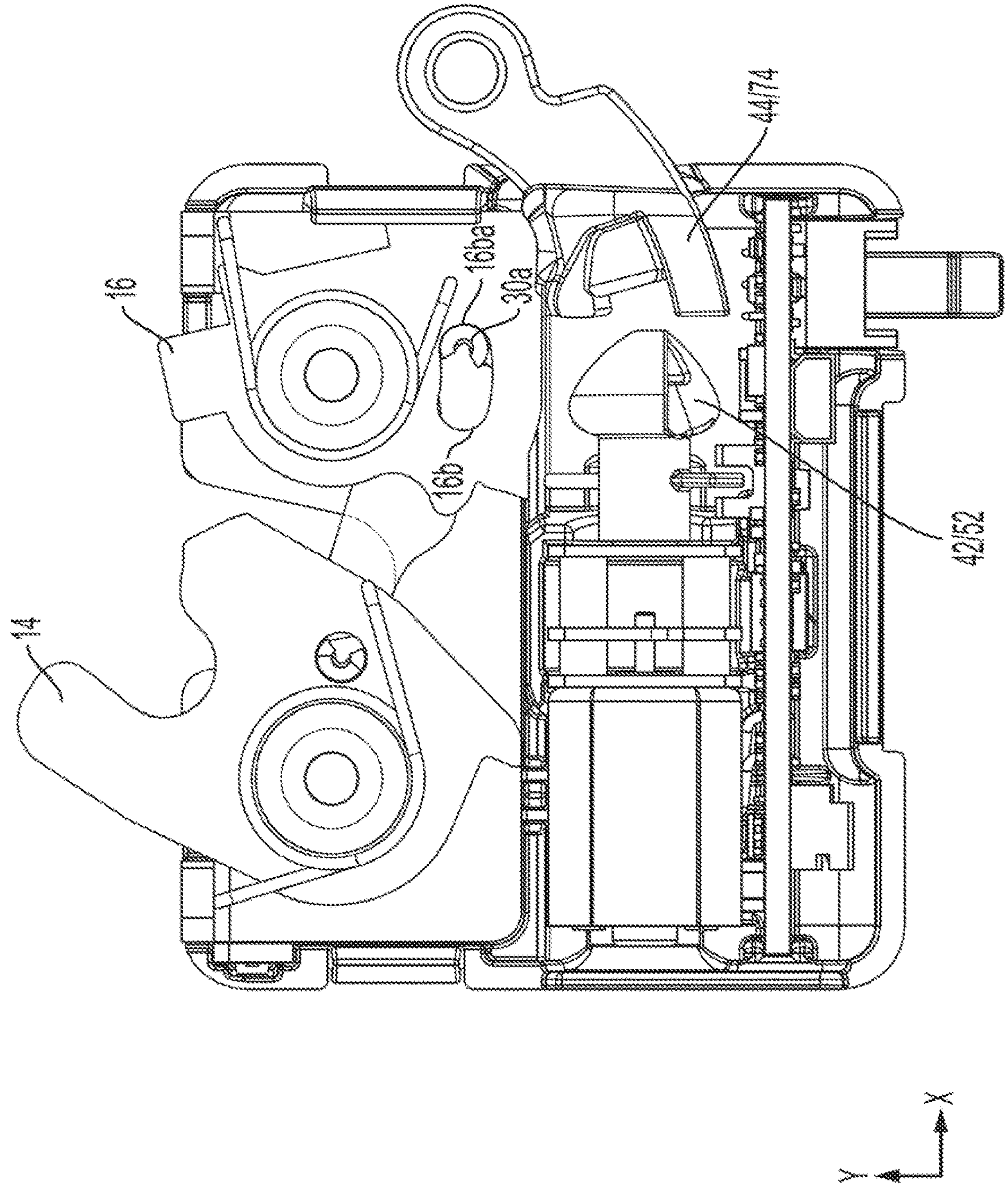

If the latch 10 is operated in a re-lock mode, the motor 40 does not stop rotating the output cam 42 to the bearing engagement position shown in FIGS. 8A and 10, rather, the motor 40 continues to rotate the output cam 42 in the direction D to the position shown in FIGS. 11A and 11B. It should be understood that FIG. 9 is not applicable to the re-lock mode.

Turning now to FIGS. 11A and 11B, those figures depict rear and front elevation views, respectively, of the latch 10 shown in an open and pre-locked configuration. Starting from the state shown in FIG. 8A, the motor 40 continues to rotate the output cam 42 in the direction D to the position shown in FIGS. 11A and 11B. In the state shown in FIGS. 11A and 11B, the teeth 74 of the input cam 44 are rotationally aligned with the spaces between the teeth 52 of the output cam 42, and vice versa, such that the teeth 74 can be moved into meshed engagement with the teeth 52 when the trigger 16 is moved to the locked position by the pawl 14. In FIG. 11A, the trigger 16 is prevented from rotating about axis B to the locked position under the bias of the spring 26 due to the bearing engagement between the pin 30*a* of the link 30 and the end 16*ba* of the slot 16*b* of the trigger 16. Accordingly, in FIG. 11A, the sensor 34 cannot detect the presence of the input cam 44, thereby indicating to the processor of the latch 10 that the latch 10 is unlocked.

Figure 12A:
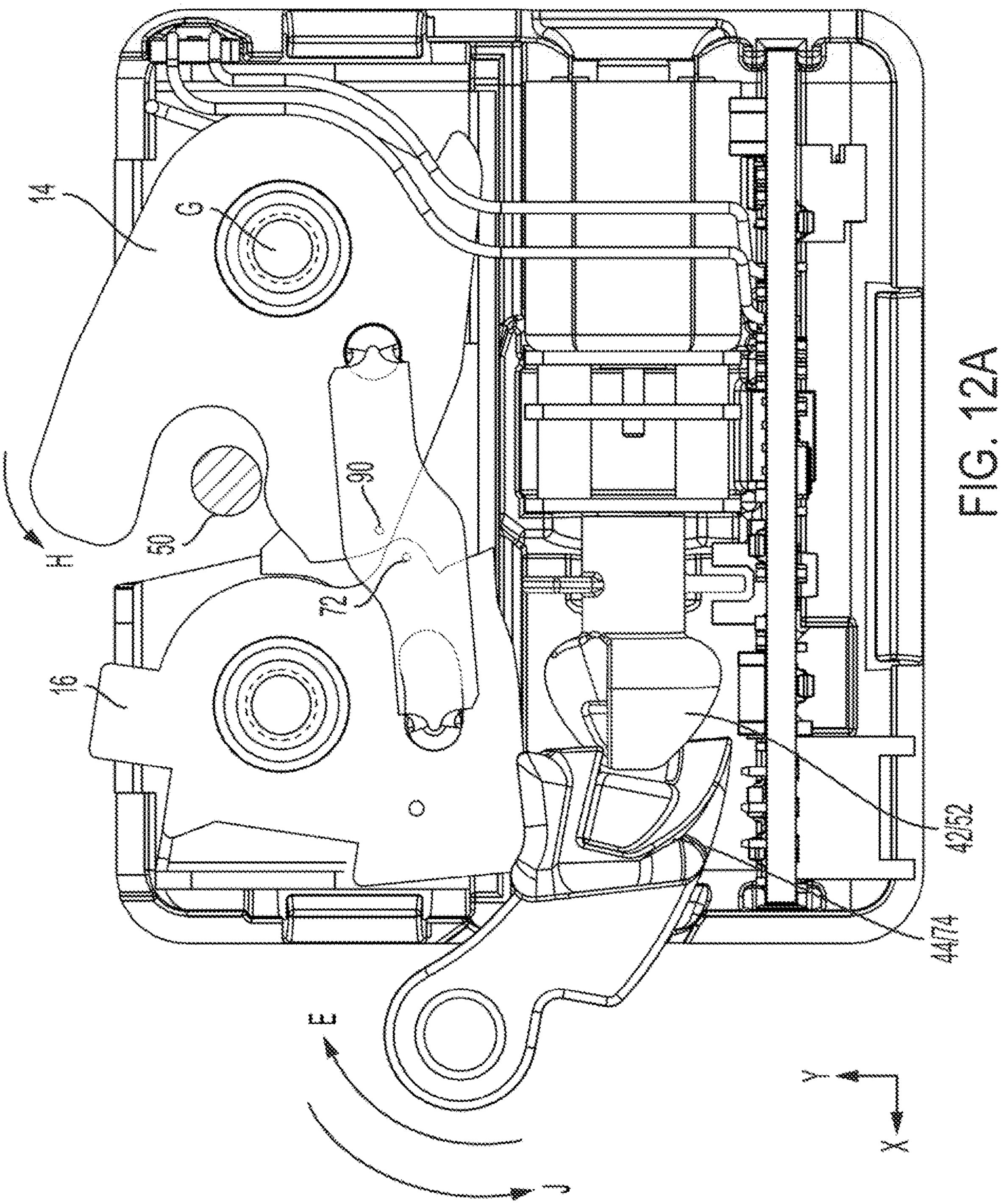
FIGS. 12A and 12B depict rear and front elevation views, respectively, of the latch of FIGS. 1A-1E shown in a partially-closed and pre-locked configuration, wherein the striker is shown rotating the pawl downward.
Figure 12B:
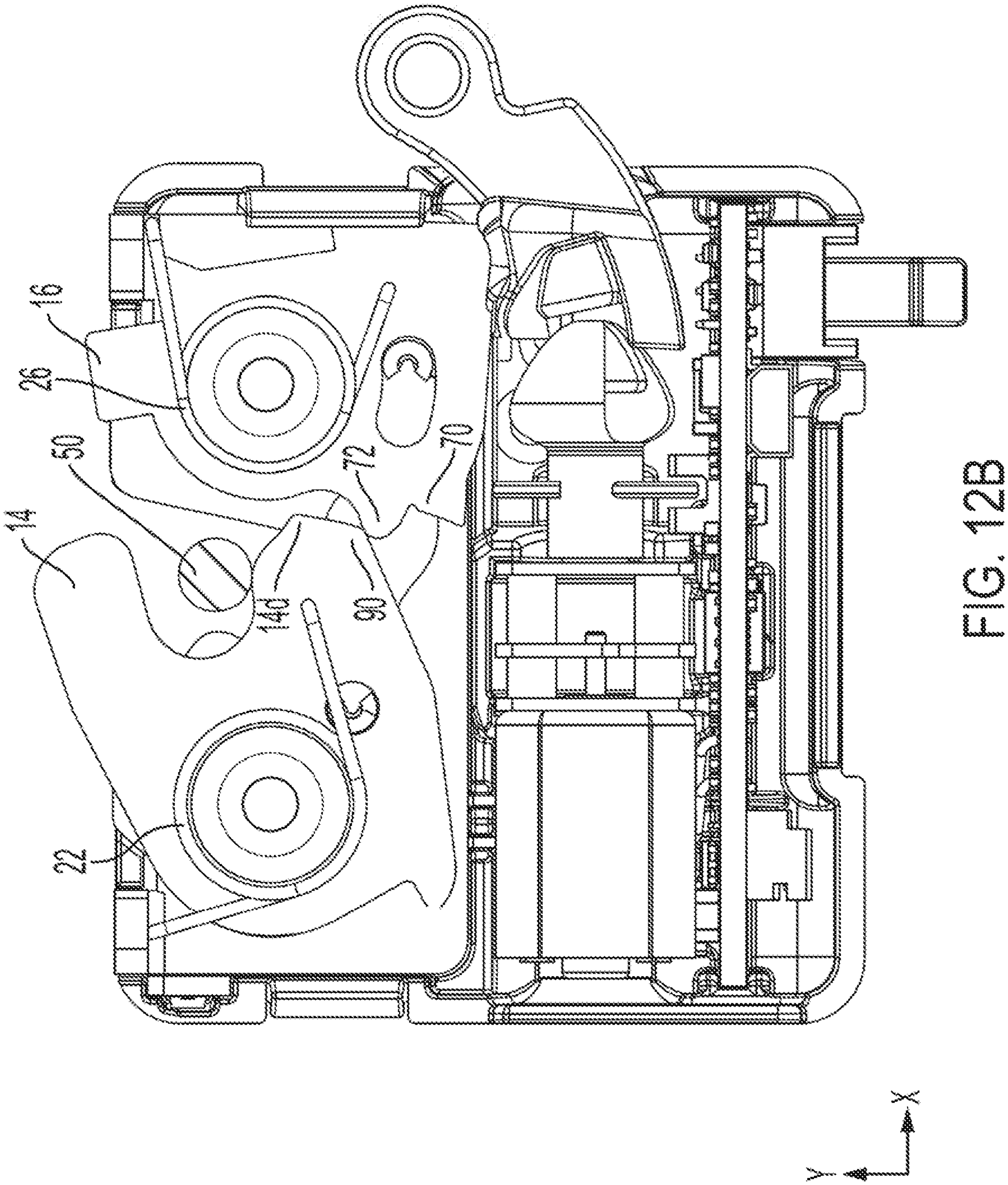

Turning now to FIGS. 12A and 12B, those figures depict rear and front elevation views, respectively, of the latch 10 shown in a partially-closed and pre-locked configuration. In those figures, the striker 50 has been inserted into the latch 10, and is in the process of rotating the pawl 14 in direction H about axis G and against the bias of the spring 22 toward the closed position. As the pawl 14 rotates in the direction H, the striker 16 rotates in the direction J by virtue of the spring 26 that biases the striker 16 toward the locked position. The link 30 permits such rotation of the striker 16. As the trigger 16 rotates in the direction J, the teeth 74 of the input cam 44 move into the spaces between the teeth 52 of the output cam 42, and vice versa. The edge 90 of the pawl 14 eventually contacts the nose 72 of the trigger 16, thereby slightly rotating the trigger 16 in the direction of arrow E.

Figure 13A:
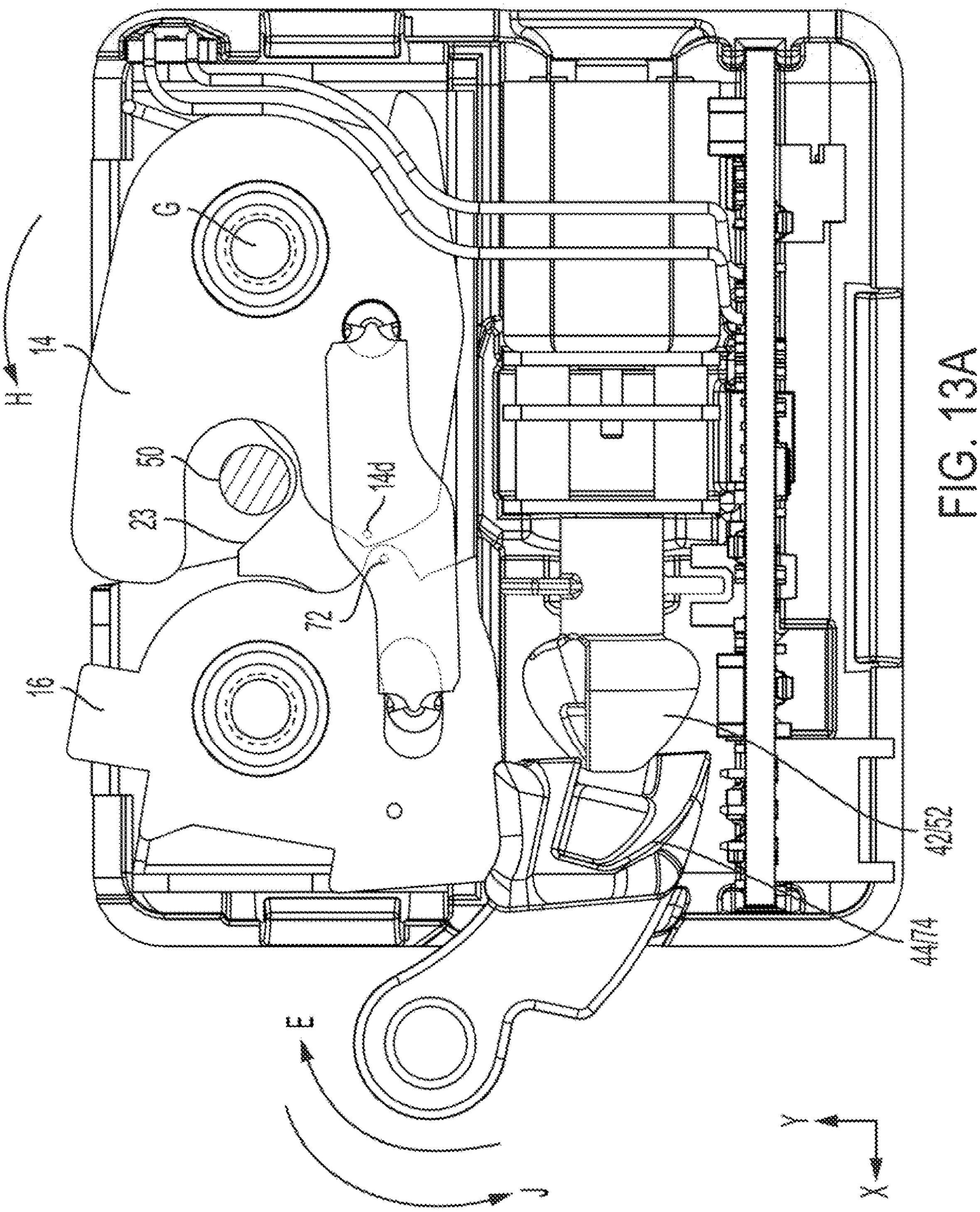
Figure 13B:
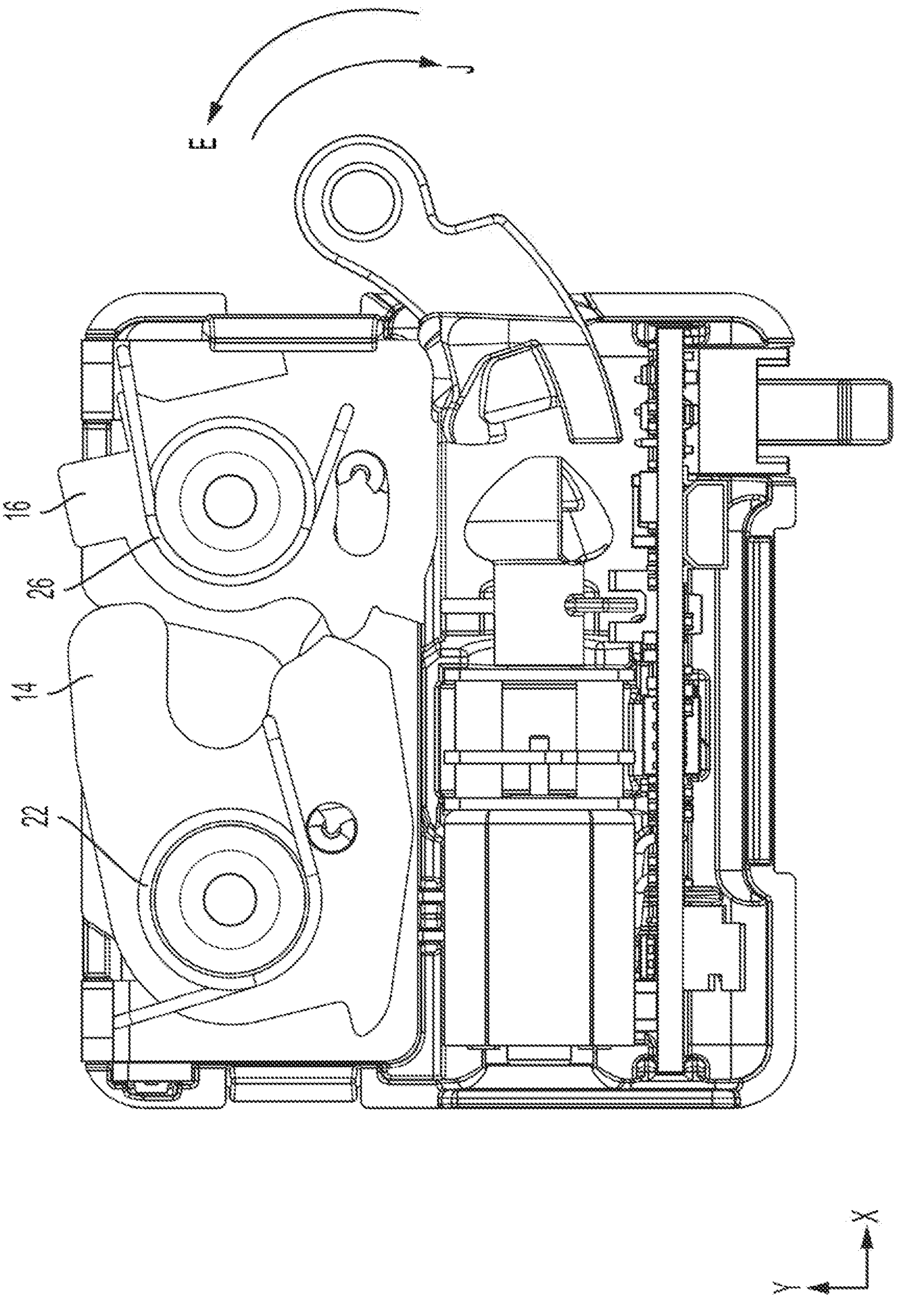

Turning now to FIGS. 13A and 13B, those figures depict rear and front elevation views, respectively, of the latch 10 shown in a nearly-closed and pre-locked configuration. In FIG. 13A, the striker 50 continues to rotate the pawl 14 in direction H about axis G and against the bias of the spring 22 toward the closed position. The bearing surface 14*d* of the pawl 14 contacts the nose 72 of the trigger 16, thereby slightly rotating the trigger 16 in the direction E. After the bearing surface 14*d* of the pawl 14 clears the nose 72 of the trigger 16, the trigger 16 continues to rotate in direction J. As the trigger 16 rotates in the direction J, the teeth 74 of the input cam 44 continue to move into the spaces between the teeth 52 of the output cam 42, and vice versa. Rotation of the pawl 14 is continued until the striker 50 bears against the stop 23, at which time the bearing surface 14*d* of the pawl 14 is mated with the bearing surface 70 of the trigger 16, thereby locking the trigger 16 and the pawl 14 in the locked position, and thereby locking the striker 50 in the latch 10, as shown in FIG. 5A.

One exemplary application for the latch 10 is shown (only) in FIG. 9. That figure shows that latch 10 fixedly mounted to a frame 98 having an opening 99. A door 100 (or drawer) is movably connected with respect the opening 99 of the frame 98 for either revealing or concealing the opening 99. The striker 50 is fixedly connected to the door 100. When the striker 50 is positioned within the latch 10, the door 100 conceals the opening 99. Alternatively, when the striker 50 is substantially separated from the latch 10, the opening 99 is accessible. It should be understood that the striker 50 could be connected to the frame 98 and the latch 10 could be connected to the door 100 without departing from the scope or spirit of the invention.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed is:

1. A latch for capturing a striker, the latch comprising:

a pawl mounted to rotate between a closed position and an open position, the pawl being biased to rotate toward the open position and configured to capture the striker when in the closed position;

a trigger mounted to rotate about a first axis between a locked position and an unlocked position, the trigger being biased to rotate toward the locked position and selectively positionable to contact the pawl when the pawl is in the closed position, thereby retaining the pawl in the closed position;

an input cam connected to the trigger;

an output cam positioned to contact the input cam, the output cam being mounted to rotate about a second axis and configured to rotate the input cam about the first axis;

a motor coupled for rotating the output cam about the second axis;

wherein rotation of the motor about the second axis causes rotation of the trigger about the first axis, and wherein the first axis is non-parallel to the second axis; and a link connecting the pawl to the trigger, wherein the link is configured to prevent the trigger from moving to the locked position while the pawl is maintained in the open position, wherein the link includes one end that is pivotably connected to the pawl, and a second end that is connected to a slot formed in the trigger, such that the link can rotate and translate along the slot with respect to the trigger.

2. The latch of claim 1, wherein the input cam includes a plurality of teeth, each of the teeth having a flat bearing surface that intersects a curved ramp surface.

3. The latch of claim 1, wherein the output cam includes a plurality of teeth, each of the teeth having a flat bearing surface that intersects a curved ramp surface.

4. The latch of claim 1, wherein each of the output cam and the input cam includes a plurality of teeth, each of the teeth having a flat bearing surface that intersects a curved ramp surface, the teeth of the output cam being configured to mesh with the teeth of the input cam such that rotation of the output cam about the second axis results in rotation of the input cam about the first axis.

5. The latch of claim 4, wherein contact between the flat bearing surfaces of the output cam and the input cam prevent the trigger from returning to the locked position when the pawl is in the open position.

6. The latch of claim 4, further comprising a sensor positioned to detect the position of the input cam of the trigger.

7. The latch of claim 6, further comprising a sensor positioned to detect when the trigger is in the locked position.

8. The latch of claim 4, wherein the teeth of the output cam and the input cam remain at least partially in physical contact during rotation of the trigger between the locked and unlocked positions.

9. The latch of claim 1, further comprising a spring positioned to bias the trigger toward the locked position.

10. The latch of claim 1, further comprising a spring positioned to bias the pawl toward the open position.

11. The latch of claim 1, wherein, when the pawl is maintained in the closed position, a bearing surface of the striker engages with a bearing surface of the pawl.

12. The latch of claim 1, wherein the trigger includes an extension that extends outside of the housing and is configured such that a force applied to the extension urges the trigger toward the unlocked position.

13. A door assembly comprising:

a frame defining an opening;

a door that is moveable with respect to the frame for concealing the opening in the frame;

a striker attached to one of the door and the frame;

a latch attached to the other of the door and the frame for capturing the striker, the latch comprising:

a pawl mounted to rotate between a closed position and an open position, the pawl being biased to rotate toward the open position and configured to capture the striker when in the closed position;

a trigger mounted to rotate about a first axis between a locked position and an unlocked position, the trigger being biased to rotate toward the locked position and selectively positionable to contact the pawl when the pawl is in the closed position, thereby retaining the pawl in the closed position;

an input cam connected to the trigger;

an output cam positioned to contact the input cam, the output cam being mounted to rotate about a second axis and configured to rotate the input cam about the first axis; and a motor coupled for rotating the output cam about the second axis;

wherein rotation of the motor about the second axis causes rotation of the trigger about the first axis, and wherein the first axis is non-parallel to the second axis; and a link connecting the pawl to the trigger, wherein the link is configured to prevent the trigger from moving to the locked position while the pawl is maintained in the open position, wherein the link includes one end that is pivotably connected to the pawl, and a second end that is connected to a slot formed in the trigger, such that the link can rotate and translate along the slot with respect to the trigger.

* * * * *